US012811215B2

(12) United States Patent
Chun et al.

(10) Patent No.: US 12,811,215 B2
(45) Date of Patent: Nov. 24, 2026

(54) BATTERY PACK AND DEVICE INCLUDING THE SAME

(71) Applicant: LG ENERGY SOLUTION, LTD., Seoul (KR)

(72) Inventors: Yongho Chun, Daejeon (KR); Donghyun Kim, Daejeon (KR); Byung Do Jang, Daejeon (KR); Hyoungsuk Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 866 days.

(21) Appl. No.: 17/771,921

(22) PCT Filed: Apr. 22, 2021

(86) PCT No.: PCT/KR2021/005078

§ 371 (c)(1),
(2) Date: Apr. 26, 2022

(87) PCT Pub. No.: WO2021/215837

PCT Pub. Date: Oct. 28, 2021

(65) Prior Publication Data

US 2022/0376326 A1 Nov. 24, 2022

(30) Foreign Application Priority Data

Apr. 22, 2020 (KR) ........................ 10-2020-0048649
Apr. 29, 2020 (KR) ........................ 10-2020-0052252
Apr. 21, 2021 (KR) ........................ 10-2021-0051619

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/613* (2015.04); *H01M 10/625* (2015.04); *H01M 10/6551* (2015.04); *H01M 50/211* (2021.01)

(58) Field of Classification Search
CPC .. H01M 10/625; H01M 50/211; H01M 10/48; H01M 10/6567; H01M 2220/20; Y02E 60/10
See application file for complete search history.

(56) References Cited

U.S. PATENT DOCUMENTS 5,975,114 A * 11/1999 Stahl ........................ G01M 3/04 257/E23.098
2012/0188543 A1 7/2012 Cicero et al.
(Continued)

FOREIGN PATENT DOCUMENTS

CN 104241729 A 12/2014
CN 109244302 A 1/2019
(Continued)

OTHER PUBLICATIONS

WO-2018186616-A1 Translated (Year: 2018).*
(Continued)

*Primary Examiner* — Jennifer A Boyd
*Assistant Examiner* — Olivia A Jones
(74) *Attorney, Agent, or Firm* — Birch, Stewart, Kolasch & Birch, LLP

(57) ABSTRACT

A battery pack includes a plurality of battery modules including battery cells; a pack frame accommodating the battery modules; a pack refrigerant pipe assembly connected to the battery module; and a pack refrigerant pipe housing accommodating the pack refrigerant pipe assembly.

17 Claims, 18 Drawing Sheets

(51) Int. Cl.

| | |
|---|---|
| ***H01M 10/625*** | (2014.01) |
| ***H01M 10/6551*** | (2014.01) |
| ***H01M 50/211*** | (2021.01) |

(56) References Cited

U.S. PATENT DOCUMENTS

| | | | | |
|---|---|---|---|---|
| 2014/0322583 | A1* | 10/2014 | Choi | B60L 50/64 429/120 |
| 2014/0332085 | A1* | 11/2014 | Grace | H01M 10/625 429/82 |
| 2018/0131055 | A1* | 5/2018 | Yang | H01M 50/213 |
| 2018/0151930 | A1 | 5/2018 | Kim et al. | |
| 2019/0089026 | A1 | 3/2019 | Choi et al. | |
| 2020/0067155 | A1 | 2/2020 | Hwang et al. | |
| 2020/0161728 | A1* | 5/2020 | Wang | H01M 10/6554 |
| 2020/0373637 | A1 | 11/2020 | Keum et al. | |
| 2020/0381792 | A1 | 12/2020 | Perrin et al. | |
| 2022/0393270 | A1 | 12/2022 | Jeon et al. | |

FOREIGN PATENT DOCUMENTS

| | | | | | |
|---|---|---|---|---|---|
| CN | 109962191 | A | * | 7/2019 | H01M 10/625 |
| CN | 110323516 | A | * | 10/2019 | H01M 10/613 |
| CN | 110854320 | A | | 2/2020 | |
| EP | 2 325 937 | A1 | | 5/2011 | |
| JP | 2014-504440 | A | | 2/2014 | |
| JP | 2022-549483 | A | | 11/2022 | |
| KR | 10-1386673 | B1 | | 4/2014 | |
| KR | 10-2015-0096663 | A | | 8/2015 | |
| KR | 10-2017-0130902 | A | | 11/2017 | |
| KR | 10-2018-0061702 | A | | 6/2018 | |
| KR | 10-2018-0081996 | A | | 7/2018 | |
| KR | 10-2019-0128466 | A | | 11/2018 | |
| KR | 10-2019-0032843 | A | | 3/2019 | |
| KR | 10-2019-0069120 | A | | 6/2019 | |
| KR | 10-2020-0001705 | A | | 1/2020 | |
| KR | 10-2066701 | B1 | | 1/2020 | |
| KR | 102065099 | B1 | * | 1/2020 | H01M 10/613 |
| KR | 10-2020-0021608 | A | | 3/2020 | |
| KR | 10-2089646 | B1 | | 3/2020 | |
| KR | 20200021608 | A | * | 3/2020 | |
| WO | WO-2017033412 | A1 | * | 3/2017 | H01M 10/613 |
| WO | WO-2018186616 | A1 | * | 10/2018 | B60L 50/66 |
| WO | WO 2019/069022 | A1 | | 4/2019 | |

OTHER PUBLICATIONS

"Review on Various Gaskets Based on the Materials, their Characteristics and Applications" by Aidbada et al. (published January 2017—International Journal on Textile Engineering and Processes) (Year: 2017).*

KR20200021608A Translated (Year: 2020).*

WO-2017033412-A1 Translated (Year: 2017).*

Machine Translation Relied Upon for CN-109962191-A (Year: 2019).*

Machine Translation Relied Upon for KR-102065099-B1 (Year: 2020).*

Machine Translation Relied Upon for CN-110323516-A (Year: 2019).*

International Search Report (PCT/ISA/210) issued in PCT/KR2021/005078, dated Jul. 28, 2021.

Extended European Search Report for European Application No. 21793215.1, dated Nov. 24, 2023.

* cited by examiner

Conventional Art

Conventional Art

BATTERY PACK AND DEVICE INCLUDING THE SAME

CROSS-REFERENCE TO RELATED APPLICATION(S)

This application claims priority to and the benefit of Korean Patent Application No. 10-2020-0048649 filed in the Korean Intellectual Property Office on Apr. 22, 2020, Korean Patent Application No. 10-2020-0052252 filed in the Korean Intellectual Property Office on Apr. 29, 2020, and Korean Patent Application No. 10-2021-0051619 filed in the Korean Intellectual Property Office on Apr. 21, 2021, the entire contents of which are incorporated herein by reference.

TECHNICAL FIELD

The present invention relates to a battery pack and a device including the same, and more specifically, to a battery pack having improved cooling performance and a device including the same.

BACKGROUND ART

In modern society, in accordance with the daily use of portable devices such as a mobile phone, a laptop computer, a camcorder, a digital camera, and the like, technologies of a field related to the above-mentioned mobile devices have been actively developed. In addition, rechargeable secondary batteries are used as a power source for an electric vehicle (EV), a hybrid electric vehicle (HEV), a plug-in hybrid electric vehicle (P-HEV), and the like, in an attempt to solve air pollution and the like caused by existing gasoline vehicles using fossil fuel, and therefore, there is an increasing need for development of the secondary battery.

Currently commercialized secondary batteries include a nickel cadmium battery, a nickel hydrogen battery, a nickel zinc battery, a lithium secondary battery, and the like, and among them, the lithium secondary battery has come into the spotlight because of its advantages, for example, hardly exhibiting memory effects compared to nickel-based secondary batteries and thus being freely charged and discharged, and having a very low self-discharge rate and high energy density.

Such a lithium secondary battery mainly uses a lithium-based oxide and a carbonaceous material as a positive electrode active material and a negative electrode active material, respectively. The lithium secondary battery includes an electrode assembly in which a positive electrode plate and a negative electrode plate respectively coated with the positive electrode active material and the negative electrode active material are disposed with a separator interposed therebetween, and a battery case that seals and accommodates the electrode assembly together with an electrolyte.

Generally, the lithium secondary battery may be classified into a can type of secondary battery in which the electrode assembly is embedded in a metal can, and a pouch type of secondary battery in which the electrode assembly is embedded in a pouch of an aluminum laminate sheet, depending on a shape of the exterior material.

In a case of a secondary battery used for a small-sized device, two to three battery cells are arranged, but in a case of a secondary battery used for a medium to large-sized device such as an automobile, a battery module in which a plurality of battery cells are electrically connected is used. In the battery module, usually, the plurality of secondary batteries are connected to each other in series and in parallel, thereby enhancing capacity and output. In addition, one or more battery modules may be mounted together with various control and protection systems, such as a battery management system (BMS) and a cooling system, to form a battery pack.

When the secondary battery is heated over an appropriate temperature, performance of the secondary battery may deteriorate, and in severe cases, the secondary battery may explode or combust. Particularly, in the battery module or battery pack provided with a plurality of secondary batteries, that is, battery cells, the heat emitted from the plurality of battery cells in a narrow space is accumulated, which may increase the temperature of the battery module rapidly and severely. In other words, in a case of a battery module in which a plurality of battery cells are stacked and a battery pack in which the battery module is mounted, a high output may be obtained, but it is not easy to remove heat generated in the battery cells during charging and discharging. When heat dissipation of the battery cell is not properly performed, deterioration of the battery cell is accelerated and lifespan thereof is shortened, and possibility of explosion or ignition increases.

Further, when the battery module is included in a battery pack for a vehicle, the battery module may be frequently exposed to direct sunlight, and may also be placed in a high-temperature condition, for example in summer or in a desert.

Therefore, when a battery module or a battery pack is configured, it is very important to ensure stable and effective cooling performance.

FIG. 1 illustrates a perspective view of a conventional battery module, and FIG. 2 illustrates a cross-sectional view taken along line 2-2 of FIG. 1. Particularly, FIG. 2 further illustrates a heat transfer member and a heat sink positioned under the battery module.

Referring to FIG. 1 and FIG. 2, in a conventional battery module 10, a plurality of battery cells 11 are stacked to form a battery cell stack 20, and the battery cell stack 20 is accommodated in a module frame 30.

As described above, since the battery module 10 includes the plurality of battery cells 11, a large amount of heat is generated during charging and discharging processes. As a cooling means, the battery module 10 may include a thermally conductive resin layer 40 positioned between the battery cell stack 20 and a bottom part 31 of the module frame 30. In addition, when the battery module 10 is mounted in a pack frame to form a battery pack, a heat transfer member 50 and a heat sink 60 may be sequentially positioned under the battery module 10. The heat transfer member 50 may be a heat dissipation pad, and the heat sink 60 may have a refrigerant flow path formed therein.

Heat generated from the battery cell 11 sequentially passes through the thermally conductive resin layer 40, the bottom part 31 of the module frame 30, the heat transfer member 50, and the heat sink 60 to be transmitted to the outside of the battery module 10.

However, in the case of the conventional battery module 10, the heat transmitting path is complicated as described above, and it is difficult to effectively transmit the heat generated from the battery cell 11. The module frame 30 itself may reduce the heat conduction characteristics, and fine air layers such as air gaps that may respectively formed between the module frame 30, the heat transmitting member 50, and the heat sink 60 may also be a factor that deteriorates the heat conductive characteristic.

On the other hand, a flow path of a refrigerant is formed inside the heat sink 60, and this refrigerant is usually a coolant, and a fluid indirect cooling structure in which the coolant flows inside the battery pack to lower a temperature thereof may be applied.

However, there may be a situation in which a coolant leaks due to assembly defects or accidents during operation, and the leaked coolant may penetrate into the battery pack and cause a fire or explosion.

As other demands such as downsizing and capacity increase are continuing for the battery pack, it is substantially necessary to develop a battery pack that may satisfy these various requirements while improving cooling performance and minimizing damage caused by coolant leakage.

DISCLOSURE

Technical Problem

The present invention has been made in an effort to provide a battery pack with improved cooling performance and a device including the same.

However, the objective of the present invention is not limited to the aforementioned one, and may be extended in various ways within the spirit and scope of the present invention.

Technical Solution

An embodiment of the present invention provides a battery pack including: a plurality of battery modules, each of the plurality of battery modules including battery cells; a pack frame accommodating the plurality of battery modules; a pack refrigerant pipe assembly connected to the plurality of battery modules; and a pack refrigerant pipe housing accommodating the pack refrigerant pipe assembly.

The battery pack may further include a housing cover covering an upper portion of the pack refrigerant pipe housing; and a first gasket sealing between the pack refrigerant pipe housing and the housing cover.

An opening may be formed in a bottom surface of the pack refrigerant pipe housing, and a second gasket may be coupled to a portion of the pack refrigerant pipe housing in which the opening is formed.

The battery module may include: a battery cell stack in which the battery cells are stacked; a module frame accommodating the battery cell stack; a heat sink positioned below a bottom part of the module frame; and at least one cooling port supplying a refrigerant to the heat sink or discharging a refrigerant from the heat sink. The module frame may include a module frame protrusion protruding from the bottom part of the module frame, and the second gasket may be positioned between the module frame protrusion and the pack refrigerant pipe housing.

The bottom part of the module frame may configure an upper plate of the heat sink, and the bottom part of the module frame may be in contact with the refrigerant.

The at least one cooling port, at an upper surface of the module frame protrusion, may pass through the second gasket and the opening to protrude into the pack refrigerant pipe housing.

The pack refrigerant pipe assembly may include a pack refrigerant pipe and at least one connecting port connecting the pack refrigerant pipe and the cooling port. The at least one connecting port may penetrate the opening and the second gasket to be coupled to the at least one cooling port.

The at least one cooling port may be inserted into and coupled to a lower side of the at least one connecting port, and a lower end of the at least one connecting port may be in contact with an upper surface of the module frame protrusion.

A sealing member may be positioned between the at least one cooling port and the at least one connecting port.

A coupling hole may be formed in a bottom surface of the pack refrigerant pipe housing, and a coupling member may be inserted into the coupling hole to couple the pack refrigerant pipe housing and the pack frame.

The battery pack may further include a drain valve that is formed on the bottom surface of the pack refrigerant pipe housing and has a structure that is able to be opened and closed.

A first outlet may be formed in the pack refrigerant pipe housing, a second outlet may be formed in the pack frame, and the drain valve may connect the first outlet and the second outlet.

The drain valve may include a spacer formed as a connecting pipe connecting the first outlet and the second outlet, and a drain plug inserted into the connecting pipe.

The connecting pipe may include a first connecting pipe of a first outlet direction and a second connecting pipe of a second outlet direction. The first connecting pipe may have a smaller inner diameter than the second connecting pipe. The drain plug may include an inserting part having a diameter corresponding to an inner diameter of the first connecting pipe and a fixing part having a diameter corresponding to an inner diameter of the second connecting pipe.

The drain valve may further include a sealing ring positioned between the spacer and the drain plug.

The battery pack may further include a leakage detecting sensor accommodated in the pack refrigerant pipe housing.

The plurality of battery modules may be disposed in a lattice form, and the pack refrigerant pipe assembly and the pack refrigerant pipe housing may be disposed between the plurality of battery modules.

The pack refrigerant pipe assembly may include a pack refrigerant pipe, and the pack refrigerant pipe may include a main pack refrigerant pipe and a sub-pack refrigerant pipe connecting the main pack refrigerant pipe and the plurality of battery modules. The sub-pack refrigerant pipe may extend from one end of the main pack refrigerant pipe in both directions perpendicular to a longitudinal direction of the main pack refrigerant pipe. The pack refrigerant pipe housing may extend along portions in which the main pack refrigerant pipe and the sub-pack refrigerant pipe extend.

The battery module may include a heat sink, a refrigerant injecting port supplying a refrigerant to the heat sink, and a refrigerant discharging port discharging a refrigerant from the heat sink. The refrigerant injecting port formed in a first battery module of the plurality battery modules adjacent to each other and the refrigerant discharging port formed in a second battery module of the plurality of battery modules adjacent the first battery module may face each other.

The battery modules may be disposed in two rows in a direction in which the battery cells are stacked. The refrigerant injecting port and the refrigerant discharging port may be disposed between the first battery module and the second battery module.

Advantageous Effects

According to the embodiments of the present invention, it is possible to improve cooling performance through a battery module structure in which a module frame and a heat sink are integrated. In this case, a cooling port is formed in each of battery modules in a battery pack, so that uniform cooling performance in each of the battery module may be realized.

In addition, a pack refrigerant pipe that transmits a refrigerant to the cooling port is accommodated in the housing, so that it is possible to prevent leakage of the refrigerant from leading to a fire or explosion of the battery pack.

In addition, the number of the battery modules in the battery pack is minimized by maximizing the number of battery cell units in the battery module, and thus it is possible to reduce a risk of refrigerant leakage in the battery pack by reducing the number of cooling ports.

The effects of the present invention are not limited to the effects mentioned above, and other effects not mentioned can be clearly understood by those skilled in the art from the description of the claims.

MODE FOR INVENTION

Figure 1:
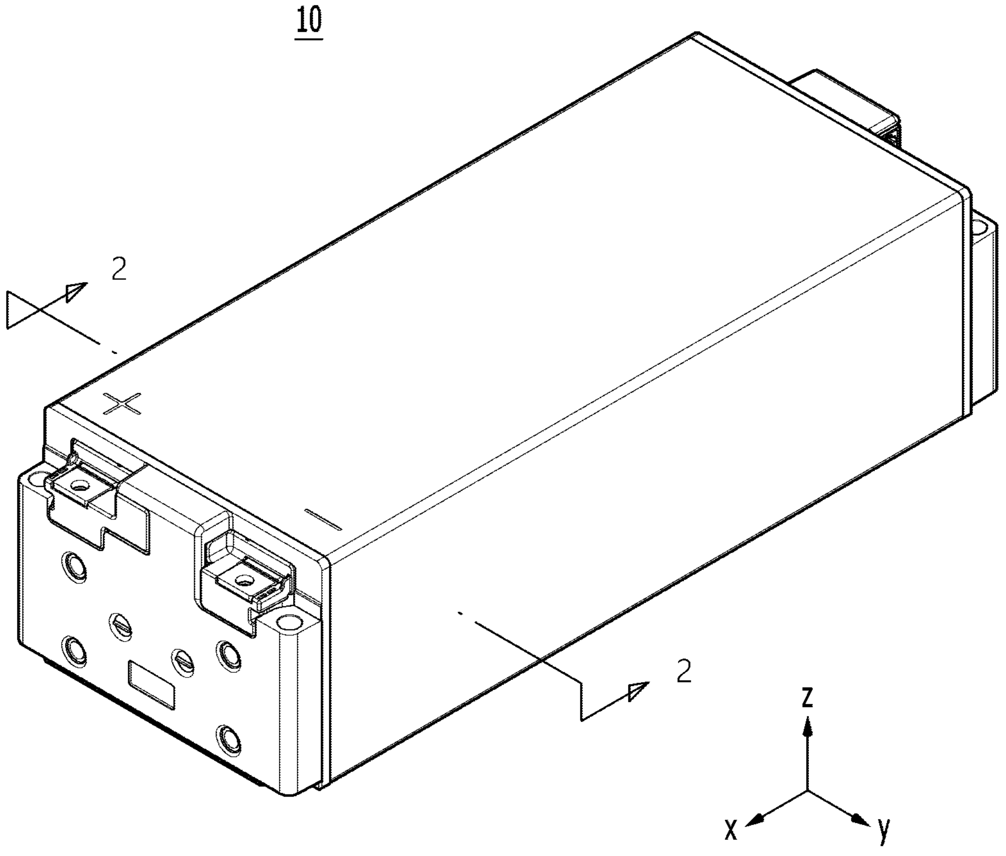
FIG. 1 illustrates a perspective view of a conventional battery module.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

In order to clearly describe the present invention, parts or portions that are irrelevant to the description are omitted, and identical or similar constituent elements throughout the specification are denoted by the same reference numerals.

Further, in the drawings, the size and thickness of each element are arbitrarily illustrated for ease of description, and the present disclosure is not necessarily limited to those illustrated in the drawings. In the drawings, the thicknesses of layers, films, panels, regions, areas, etc., are exaggerated for clarity. In the drawings, for ease of description, the thicknesses of some layers and areas are exaggerated.

It will be understood that when an element such as a layer, film, region, area, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, throughout the specification, the phrase "in a plan view" or "on a plane" means viewing a target portion from the top, and the phrase "in a cross-sectional view" or "on a cross-section" means viewing a cross-section formed by vertically cutting a target portion from the side.

Hereinafter, a battery module according to the present embodiment will be described with reference to FIG. 3 to FIG. 5.

Figure 3:
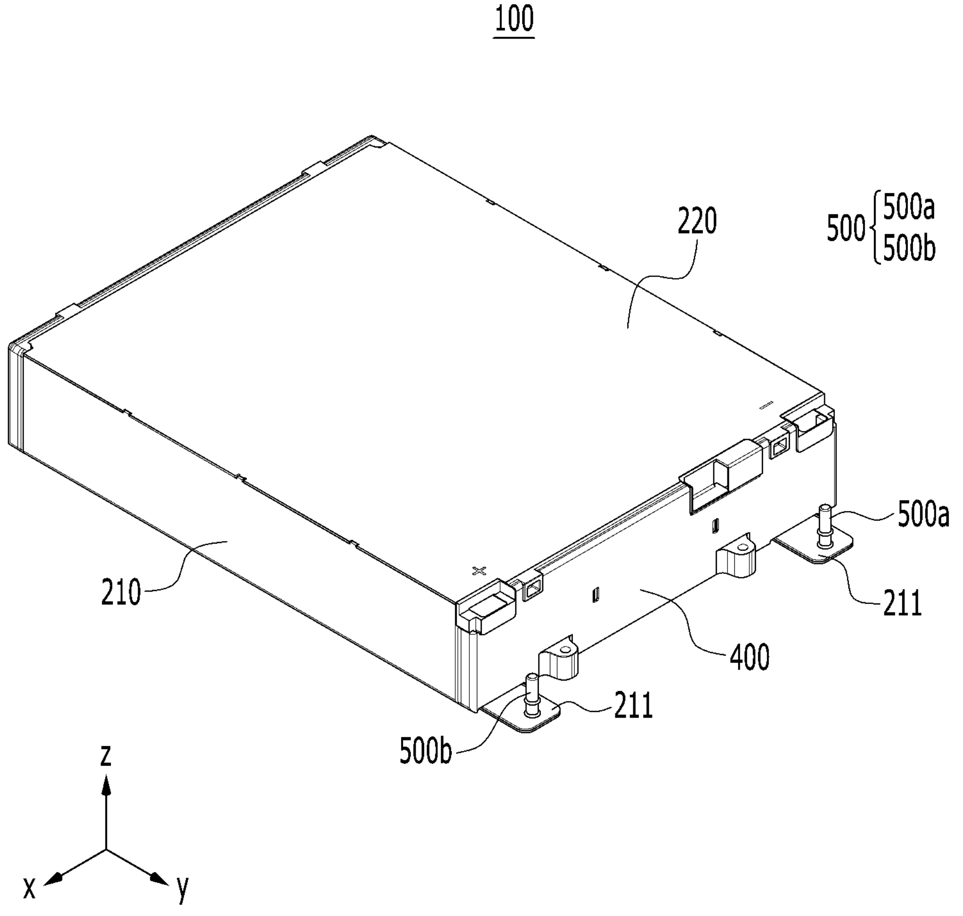
FIG. 3 illustrates a perspective view of a battery module according to an embodiment of the present invention.

FIG. 3 illustrates a perspective view of a battery module according to an embodiment of the present invention. FIG. 4 illustrates an exploded perspective view of the battery module of FIG. 3. FIG. 5 is a perspective view of the battery module of FIG. 3 viewed from top to bottom along a z-axis direction.

Figure 4:
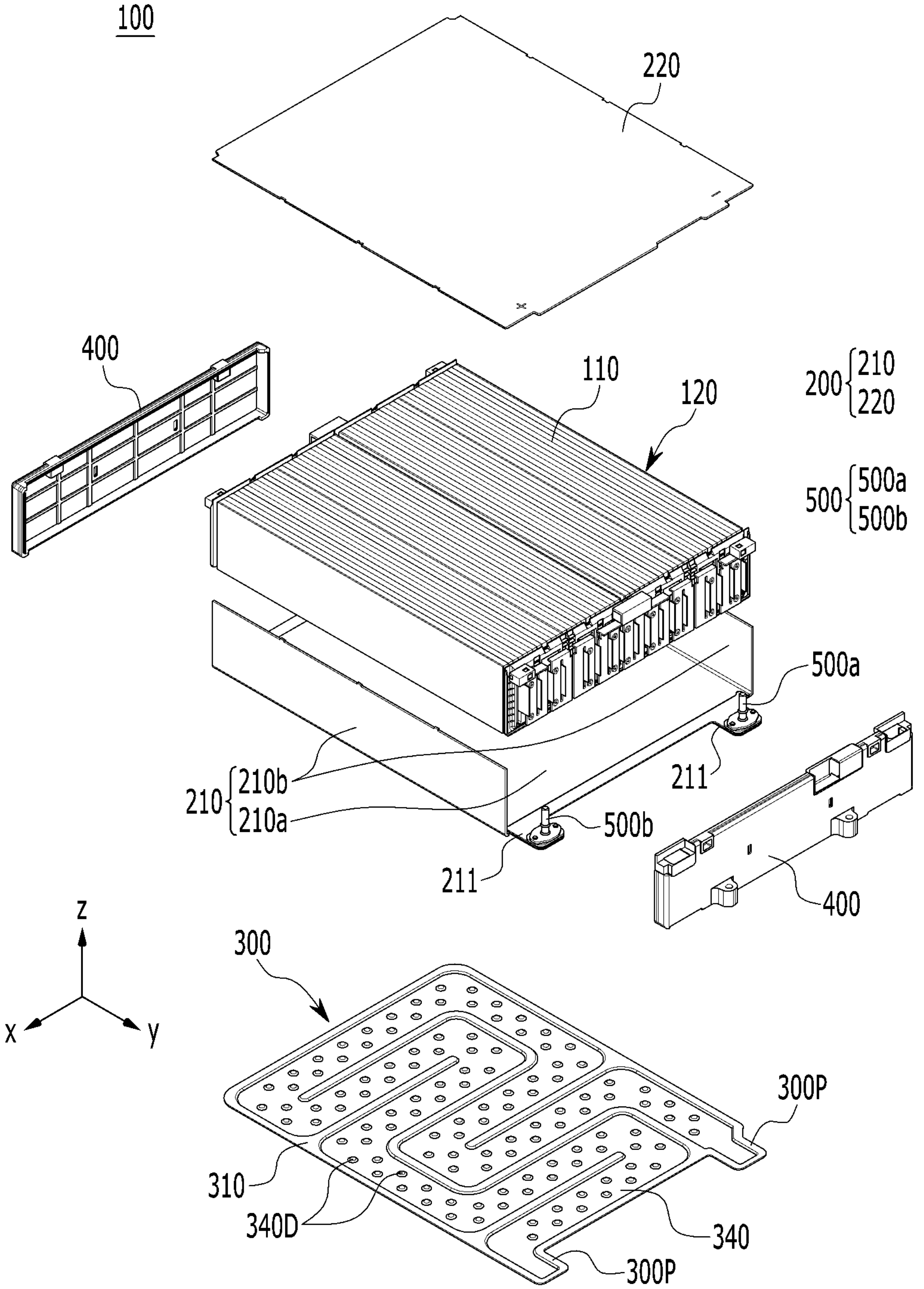
FIG. 4 illustrates an exploded perspective view of the battery module of FIG. 3.
Figure 5:
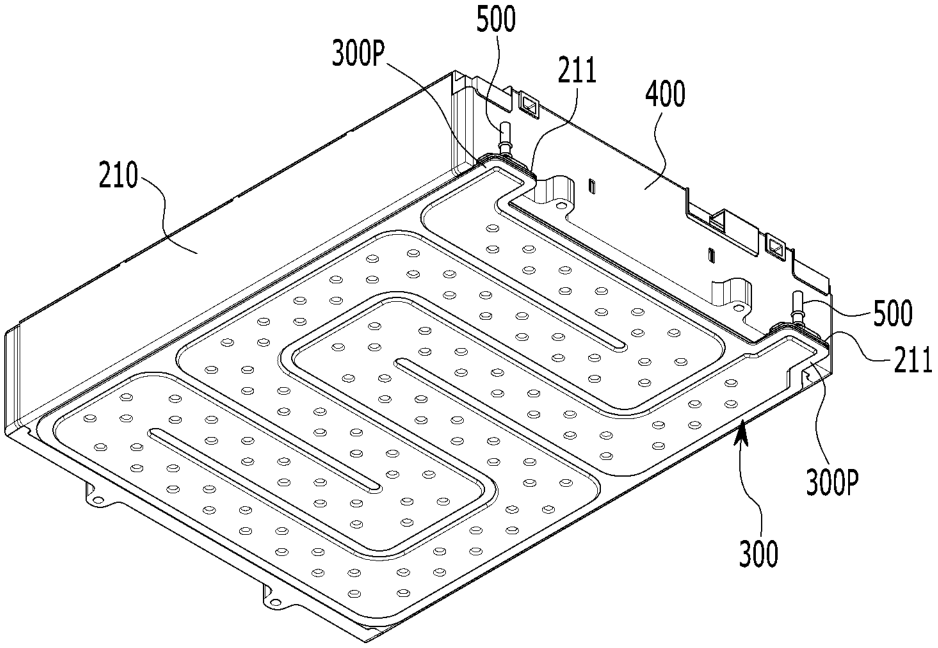
FIG. 5 is a perspective view of the battery module of FIG. 3 viewed from top to bottom along a z-axis direction.

Referring to FIG. 3 to FIG. 5, a battery module 100 according to an embodiment of the present invention may include a battery cell stack 120 in which battery cells 110 are stacked, a module frame 200 that accommodates the battery cell stack 120, and a heat sink 300 that is positioned below a bottom part 210*a* of the module frame 200. The bottom part 210*a* of the module frame 200 configures an upper plate of the heat sink 300, and a recessed part 340 of the heat sink 300 and the bottom part 210*a* of the module frame 200 form a refrigerant flow path.

First, the battery cell 110 may be a pouch-type of battery cell. Such a pouch-type of battery cell may be formed by accommodating an electrode assembly in a pouch case of a laminate sheet including a resin layer and a metal layer, and then thermally-fusing an exterior circumference of the pouch case. In this case, the battery cell 110 may be formed to have a rectangular sheet-like structure.

A plurality of the battery cells 110 may be configured, and the plurality of battery cells 110 are stacked to be electrically connected to each other to form the battery cell stack 120. Particularly, as shown in FIG. 4, the plurality of battery cells 110 may be stacked along a direction parallel to an x-axis.

The module frame 200 accommodating the battery cell stack 120 may include an upper cover 220 and a U-shaped frame 210.

The U-shaped frame 210 may include the bottom part 210*a* and two side portions 210*b* extending upwardly from both ends of the bottom part 210*a*. The bottom part 210*a* may cover a lower surface of the battery cell stack 120, and the side portions 210*b* may cover both side surfaces of the battery cell stack 120.

The upper cover 220 may be formed to have a single plate-shaped structure that surrounds the remaining upper surface (z-axis direction) excluding the lower surface and the both side surfaces surrounded by the U-shaped frame 210. The upper cover 220 and the U-shaped frame 210 may form a structure that covers the battery cell stack 120 up, down, left, and right by being coupled by welding or the like in a state in which corner portions corresponding to each other contact each other. The battery cell stack 120 may be physically protected through the upper cover 220 and the U-shaped frame 210. To this end, the upper cover 220 and the U-shaped frame 210 may include a metal material having a predetermined strength.

Meanwhile, although not specifically illustrated, a module frame 200 according to a modified example may be a mono frame in a form of a metal plate in which an upper surface, a lower surface, and both side surfaces are integrated. That is, the U-shaped frame 210 and the upper cover 220 are not mutually coupled, but may be manufactured by extrusion molding to have a structure in which an upper surface, a lower surface, and both side surfaces are integrated.

An end plate 400 may be positioned at both open sides (in a y-axis direction), which correspond to each other, of the module frame 200 to cover the battery cell stack 120. The end plate 400 may physically protect the battery cell stack 120 and other electrical components from external impact.

Meanwhile, although not specifically illustrated, a bus bar frame on which a bus bar is mounted and an insulating cover for electrical insulation may be positioned between the battery cell stack 120 and the end plate 400.

The module frame 200 according to the present embodiment may include a module frame protrusion 211 protruding from the bottom part 210*a* of the module frame 200 to pass the end plate 400. In this case, a refrigerant may be supplied to or discharged from the heat sink 300 by a cooling port 500 connected to an upper surface of the module frame protrusion 211. That is, the battery module according to the present embodiment may include the cooling ports 500 for supplying a refrigerant to the heat sink 300 or for discharging a refrigerant from the heat sink 300.

Specifically, the cooling port 500 according to the present embodiment includes a refrigerant injecting port 500*a* for supplying a refrigerant to the heat sink 300 and a refrigerant discharging port 500*b* for discharging a refrigerant from the heat sink 300, and the refrigerant injecting port 500*a* and the refrigerant discharging port 500*b* may be respectively connected to a pack refrigerant supplying pipe and a pack refrigerant discharging pipe, which will be described later. The module frame protrusion 211 may include a first module frame protrusion and a second module frame protrusion that are spaced apart from each other at one side of the module frame 200, and the refrigerant injecting port 500*a* may be disposed on the first module frame protrusion, while the refrigerant discharging port 500*b* may be disposed on the second module frame protrusion.

Hereinafter, the heat sink according to the present embodiment will be described in detail.

Referring back to FIG. 4 and FIG. 5, the bottom part 210*a* of the module frame 200 may configure an upper plate of the heat sink 300, and the recessed part 340 of the heat sink 300 and the bottom part 210*a* of the module frame 200 may form a refrigerant flow path.

Specifically, the heat sink 300 may be formed under the module frame 200. The heat sink 300 may include a lower plate 310 that forms a frame of the heat sink 300 and is directly bonded to the bottom part 210*a* of the module frame 200 by welding or the like, and the recessed part 340 that is a path through which a refrigerant flows. In addition, the heat sink 300 may include a heat sink protrusion 300P protruding from one side of the heat sink 300 to a portion where the module frame protrusion 211 is positioned. That is, the recessed part 340 may extend to two heat sink protrusions 300P, and the two heat sink protrusions 300P may be a portion in which a refrigerant is introduced and a portion through which a refrigerant is discharged, respectively. To this end, the heat sink protrusion 300P may be positioned to correspond to the module frame protrusion 211 in which the cooling port 500 is formed.

The heat sink protrusion 300P and the module frame protrusion 211 may be directly bonded to each other by a method such as welding.

The recessed part 340 of the heat sink 300 corresponds to a portion in which the lower plate 310 is recessed downward. The recessed part 340 may be a U-shaped pipe with a cross-section cut vertically in an xz or yz plane based on a direction in which the refrigerant flow path extends, and the bottom part 210*a* may be positioned on an open upper side of the U-shaped pipe. As the lower plate 310 of the heat sink 300 contacts the bottom part 210*a*, a space between the recessed part 340 and the bottom part 210*a* becomes an area in which a refrigerant flows, that is, the refrigerant flow path. Accordingly, the bottom part 210*a* of the module frame 200 may directly contact the refrigerant.

There is no particular limitation on the manufacturing method of the recessed part 340 of the heat sink 300, but by providing a structure recessed with respect to the plate-shaped heat sink 300, a U-shaped recessed part 340 operation on an open upper side may be formed.

The recessed part 340 may extend from one of the protrusions 300P of the heat sink to the other thereof, as described above. The refrigerant supplied through the refrigerant injecting port 500*a* passes between the first module frame protrusion and the heat sink protrusion 300P to flow first into the space between the recessed part 340 and the bottom part 210*a*. Thereafter, the refrigerant moves along the recessed part 340, passes between the second module frame protrusion and the protrusion 300P of the heat sink, and then is discharged through the refrigerant discharging port 500*b*.

Meanwhile, although not shown, a thermal conductive resin layer including a thermal conductive resin may be positioned between the bottom part 210*a* of the module frame 200 of FIG. 4 and the battery cell stack 120. The thermal conductive resin layer may be formed by applying a thermal resin on the bottom part 210*a* and then curing the applied thermal conductive resin.

The thermal resin may include a thermally conductive adhesive material, and specifically, may include at least one of a silicone material, a urethane material, and an acrylic material. The thermal resin may serve to fix one or more battery cells 110 configuring the battery cell stack 120 by being liquid during application and cured after application. In addition, it has excellent thermal conductive characteristics, so that it may quickly transmit the heat generated in the battery cell 110 to a lower side of the battery module.

On the other hand, the battery module 100 according to the present embodiment may implement a cooling integrated structure of the module frame 200 and the heat sink 300 to further improve cooling performance. Since the bottom part 210*a* of the module frame 200 serves to correspond to the upper plate of the heat sink 300, a cooling integrated structure may be implemented. A cooling efficiency may be increased due to direct cooling, and a space utilization rate on the battery module 100 and the battery pack equipped with the battery module 100 may be further improved through the structure in which the heat sink 300 is integrated with the bottom part 210*a* of the module frame 200.

Figure 2:
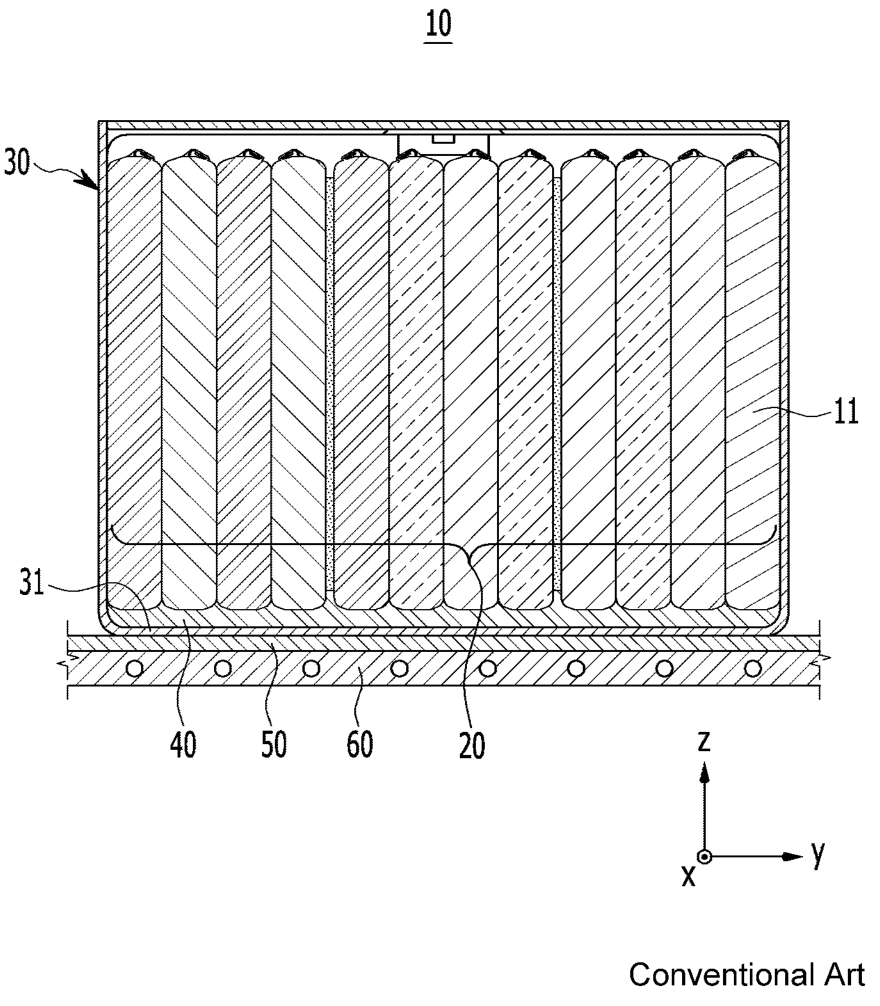
FIG. 2 illustrates a cross-sectional view taken along line 2-2 of FIG. 1.

Specifically, the heat generated in the battery cell 110 may pass through the thermal conductive resin layer (not shown) positioned between the battery cell stack 120 and the bottom part 210*a*, the bottom part 210*a* of the module frame 200, and the refrigerant to be transmitted to the outside of the battery module 100. By removing the conventional unnecessary cooling structure, the heat transmitting path may be simplified and the air gap between respective layers may be reduced, so cooling efficiency or performance may be increased. Particularly, since the bottom part 210*a* is configured of the upper plate of the heat sink 300 so that the bottom part 210*a* is in direct contact with the refrigerant, there is an advantage that more direct cooling is possible through the refrigerant. This may be compared with the related art as shown in FIG. 2 in which the heat transmitting member 50 and the upper configuration of the heat sink 60 are positioned between the bottom part 31 and the refrigerant so that cooling efficiency is reduced.

In addition, by removing the unnecessary cooling structure, a height of the battery module 100 is reduced, thereby reducing the cost and increasing the spatial utility. Furthermore, since the battery module 100 may be compactly disposed, the capacity or output of the battery pack including a plurality of battery modules 100 may be increased.

Meanwhile, the bottom part 210*a* of the module frame 200 may be bonded to the lower plate 310 portion of the heat sink 300 in which the recessed part 340 is not formed through welding. The present embodiment, through the cooling integrated structure of the bottom part 210*a* of the module frame 200 and the heat sink 300, may improve the cooling performance as described above, may support the load of the battery cell stack 120 accommodated in the module frame 200, and may reinforce the rigidity of the battery module 100. In addition, the lower plate 310 and the bottom part 210*a* of the module frame 200 are sealed through welding bonding, so that the refrigerant may flow in the recessed part 340 formed inside the lower plate 310 without leakage.

For effective cooling, it is preferable that the recessed part 340 is formed over the entire area corresponding to the bottom part 210*a* of the module frame 200 as shown in FIG. 5. To this end, the recessed part 340 may be bent at least once to be connected from one side to the other side. Particularly, in order to form the recessed part 340 over the entire area corresponding to the bottom part 210*a* of the module frame 200, the recessed part 340 is preferably bent several times. As the refrigerant moves from a start point to an end point of the refrigerant flow path formed over the entire area corresponding to the bottom part 210*a* of the module frame 200, the entire area of the battery cell stack 120 may be efficiently cooled.

Meanwhile, the refrigerant is a medium for cooling, and there is no particular limitation, but may be a coolant.

Hereinafter, a battery pack according to an embodiment of the present invention will be described with reference to FIG. 6 and FIG. 7.

Figure 6:
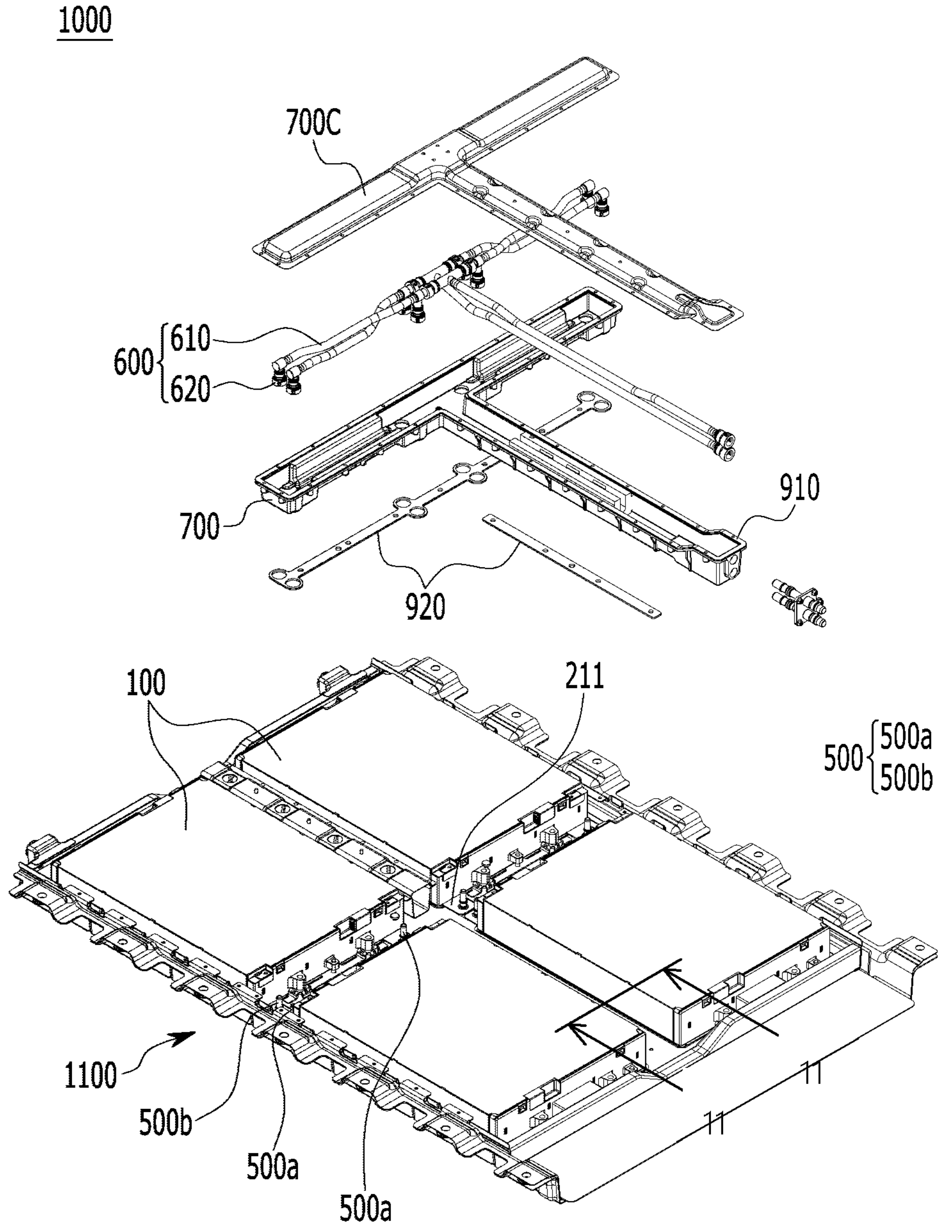
FIG. 6 illustrates an exploded perspective view of a battery pack according to an embodiment of the present invention.

FIG. 6 illustrates an exploded perspective view of a battery pack according to an embodiment of the present invention. FIG. 7 illustrates an exploded perspective view of a pack refrigerant pipe assembly and a pack refrigerant pipe housing included in the battery pack of FIG. 6.

Figure 7:
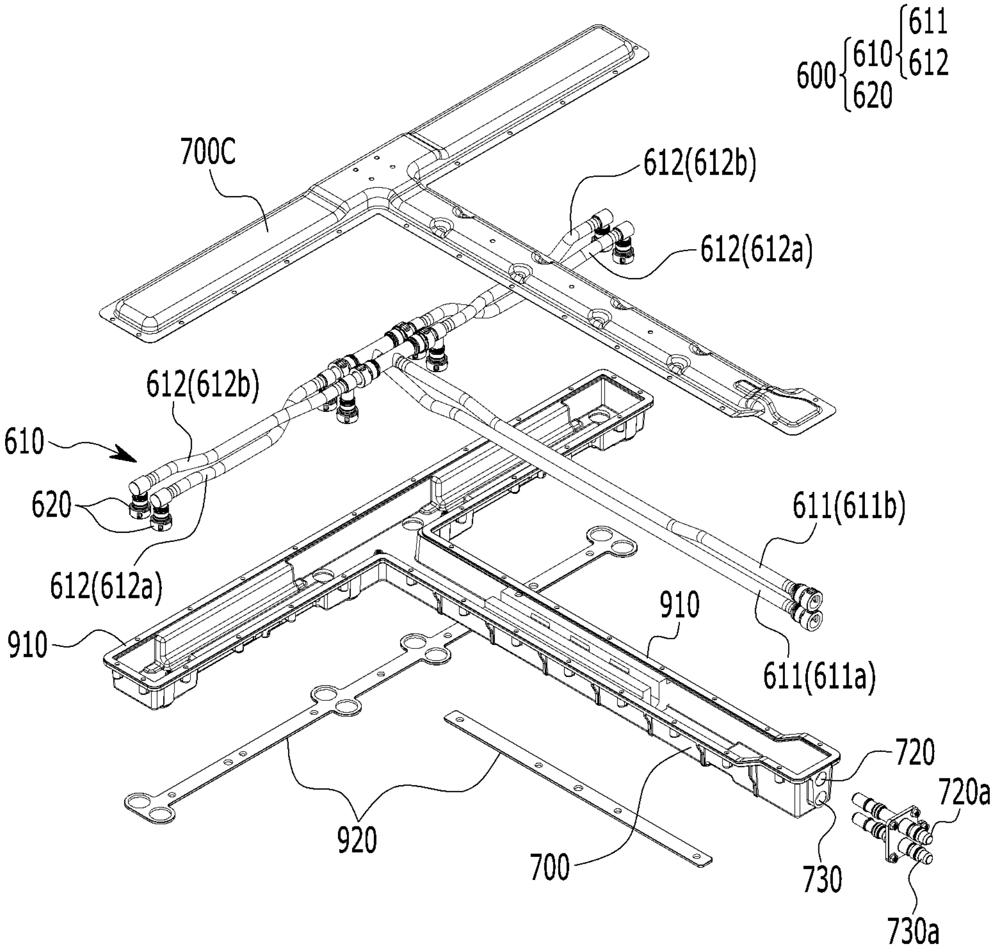
FIG. 7 illustrates an exploded perspective view of a pack refrigerant pipe assembly and a pack refrigerant pipe housing included in the battery pack of FIG. 6.

Referring to FIG. 6 and FIG. 7, a battery pack 1000 according to an embodiment of the present invention includes: a plurality of battery modules 100 including battery cells; a pack frame 1100 accommodating the battery modules 100; a pack refrigerant pipe assembly 600 connected to the battery module 100; and a pack refrigerant pipe housing 700 accommodating the pack refrigerant pipe assembly 600.

Referring to FIG. 4 together with FIG. 6 and FIG. 7, in the present embodiment, the battery modules 100 included in the battery pack 1000 include a first battery module and a second battery module that are disposed in two rows in a direction in which the battery cells 110 are stacked and that face each other in a direction perpendicular to the direction in which the battery cells 110 are stacked. The first battery module and the second battery module may refer to the battery modules 100 spaced apart from each other left and right in FIG. 6. Between the first battery module and the second battery module, the pack refrigerant pipe assembly 600 may be disposed.

In the present embodiment, the pack refrigerant pipe assembly 600 is disposed between battery modules 100 adjacent to each other. In a space between the adjacent battery modules 100 with the pack refrigerant pipe assembly 600 therebetween, as shown in FIG. 6, the cooling ports 500 formed in each of the adjacent battery modules 100 may all be disposed. In this case, the refrigerant injecting port 500*a* formed in one of the adjacent battery modules 100 and the refrigerant discharging port 500*b* formed in the other of the adjacent battery modules 100 may be disposed while facing each other.

The pack refrigerant pipe assembly 600 may include a pack refrigerant pipe 610 and a connecting port 620 connecting the pack refrigerant pipe 610 and the cooling port 500.

The pack refrigerant pipe 610 may include a main pack refrigerant pipe 611 connected to an inlet 720*a* and an outlet 730*a* and a sub-pack refrigerant pipe 612 connecting the main pack refrigerant pipe 611 and the battery module 100. Particularly, the sub-pack refrigerant pipe 612 may be connected to the battery module 100 through the connecting port 620. In addition, the sub-pack refrigerant pipes 612 may cross each other and extend. One of the sub-pack refrigerant pipes 612 crossing each other may be a sub-pack refrigerant supplying pipe 612*a*, and the other thereof may be a sub-pack refrigerant discharging pipe 612*b*.

The pack refrigerant pipe 610 according to the present embodiment has the disposition structure as described above, so that it may implement a cooling integrated structure with the battery modules 100 in the battery pack 1000. Accordingly, it is possible to simultaneously improve the cooling efficiency while increasing the space utilization rate. In order to have the disposition structure of the pack refrigerant pipe 610 as described above, heights of the sub-pack refrigerant supplying pipe 612*a* and the sub-pack refrigerant discharging pipe 612*b*, which cross each other, may be different from each other. The sub-pack refrigerant supplying pipe 612*a* and the sub-pack refrigerant discharging pipe 612*b* having the different heights may be portions.

Meanwhile, the main pack refrigerant pipe 611 may include a main pack refrigerant supplying pipe 611*a* and a main pack refrigerant discharging pipe 611*b*. The main pack refrigerant supplying pipe 611*a* may be connected to the sub-pack refrigerant supplying pipe 612*a*, and the main pack refrigerant discharging pipe 611*b* may be connected to the sub-pack refrigerant discharging pipe 612*b*.

Figure 8:
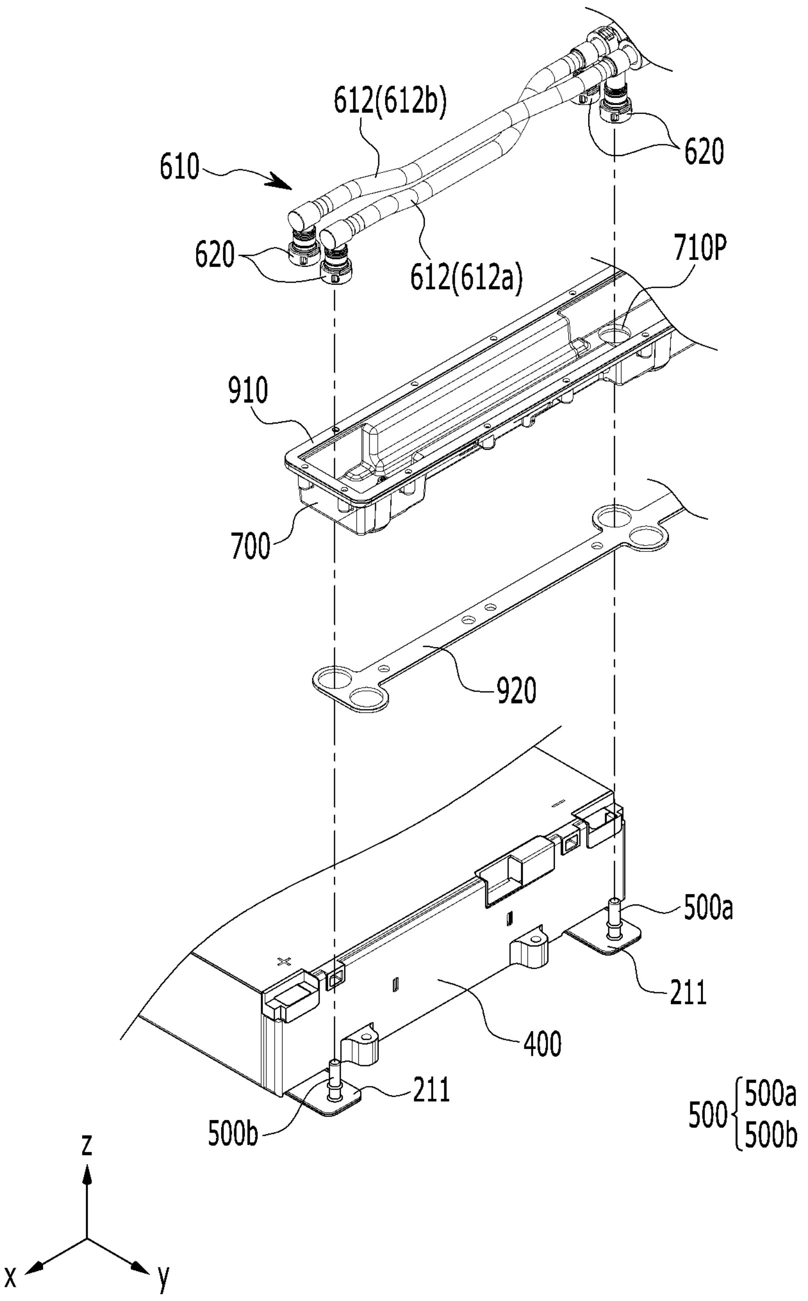
FIG. 8 illustrates a perspective view of a portion of each of a battery module, a pack refrigerant pipe, a pack refrigerant pipe housing, and a second gasket according to an embodiment of the present invention.

FIG. 8 illustrates a perspective view of a portion of each of a battery module 100, a pack refrigerant pipe 610, a pack refrigerant pipe housing 700, and a second gasket 920 according to an embodiment of the present invention.

Referring to FIG. 6 to FIG. 8, the connecting port 620 connects the cooling port 500 and the pack refrigerant pipe 610. As described above, the cooling port 500 may include a refrigerant injecting port 500*a* and a refrigerant discharging port 500*b*, and the pack refrigerant pipe 610 may include a sub-pack refrigerant supplying pipe 612*a* and a sub-pack refrigerant discharging pipe 612*b*.

In this case, the connecting port 620 may connect the refrigerant injecting port 500*a* and the sub-pack refrigerant supplying pipe 612*a*, and may connect the refrigerant discharging port 500*b* and the sub-pack refrigerant discharging pipe 612*b*. The connecting port 620 is connected to respective refrigerant injecting ports 500*a* for supplying a refrigerant to a plurality of battery modules 100, and to respective refrigerant discharge ports 500*b* for discharging a refrigerant from a plurality of battery modules 100.

The pack refrigerant pipe housing 700 accommodates the pack refrigerant pipe assembly 600. A plurality of battery modules 100 may be disposed in a lattice form, and the pack refrigerant pipe assembly 600 and the pack refrigerant pipe housing 700 may be disposed between the battery modules 100. In this case, the sub-pack refrigerant pipe 612 may respectively extend from one end of the main pack refrigerant pipe 611 in both directions perpendicular to a longitudinal direction of the main pack refrigerant pipe 611, and the pack refrigerant pipe housing 700 may extend along portions where the main pack refrigerant pipe 611 and the sub-pack refrigerant pipe 612 extend.

Meanwhile, as described above, the main pack refrigerant pipe 611 may be connected to the inlet 720*a* and the outlet 730*a*. The pack refrigerant pipe housing 700 may include an inlet connecting part 720 and an outlet connecting part 730 formed respectively at positions corresponding to the inlet 720*a* and the outlet 730*a*. The inlet connecting part 720 and the outlet connecting part 730 may include through-hole portions into which the inlet 720*a* and the outlet 730*a* may be inserted.

The battery pack 1000 may be applied to transportation means such as electric vehicles and hybrid vehicles, but a refrigerant such as a coolant may leak due to assembly defects or accidents during operation. The leaked refrigerant may penetrate into a plurality of components configuring the battery pack 1000 to cause a fire or explosion. According to the present embodiment, since the pack refrigerant pipe housing 700 is formed to cover a bottom surface and side surfaces of the pack refrigerant pipe assembly 600, by allowing the refrigerant leaked from the pack refrigerant pipe assembly 600 to stay inside the pack refrigerant pipe housing 700, it is possible to prevent the leaked refrigerant from penetrating into other components in the battery pack 1000. In this case, it is preferable to secure a maximum volume of the pack refrigerant pipe housing 700 by utilizing the space between the plurality of battery modules 100 so that the pack refrigerant pipe housing 700 may accommodate the leaked refrigerant as much as possible.

An open upper portion of the pack refrigerant pipe housing 700 may be covered by a housing cover 700C. Through this, it is possible to prevent the refrigerant leaking from the pack refrigerant pipe assembly 600 from leaking into the upper open space of the pack refrigerant pipe housing 700.

Between the pack refrigerant pipe housing 700 and the housing cover 700C, a first gasket 910 may be positioned. The first gasket 910 seals between the pack refrigerant pipe housing 700 and the housing cover 700C. The first gasket 910 may be formed along an upper end edge of the pack refrigerant pipe housing 700. The housing cover 700C may be coupled to the first gasket 910 formed along the upper end edge of the pack refrigerant pipe housing 700 to block a refrigerant from leaking into the upper portion of the pack refrigerant pipe housing 700.

Hereinafter, a connection relationship between the cooling port and the connecting port and a disposition and shape of a second gasket according to an embodiment of the present invention will be described in detail with reference to FIG. 8 to FIG. 11.

Figure 9:
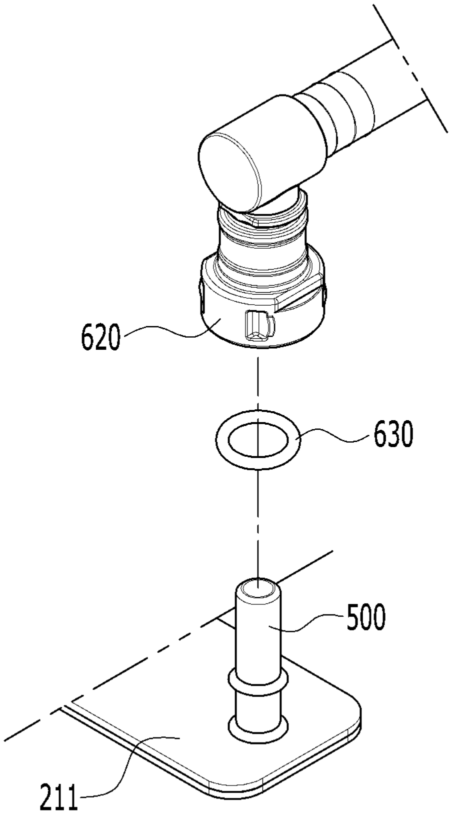
FIG. 9 partially illustrates a connecting port and a cooling port according to the present embodiment.
Figure 10:
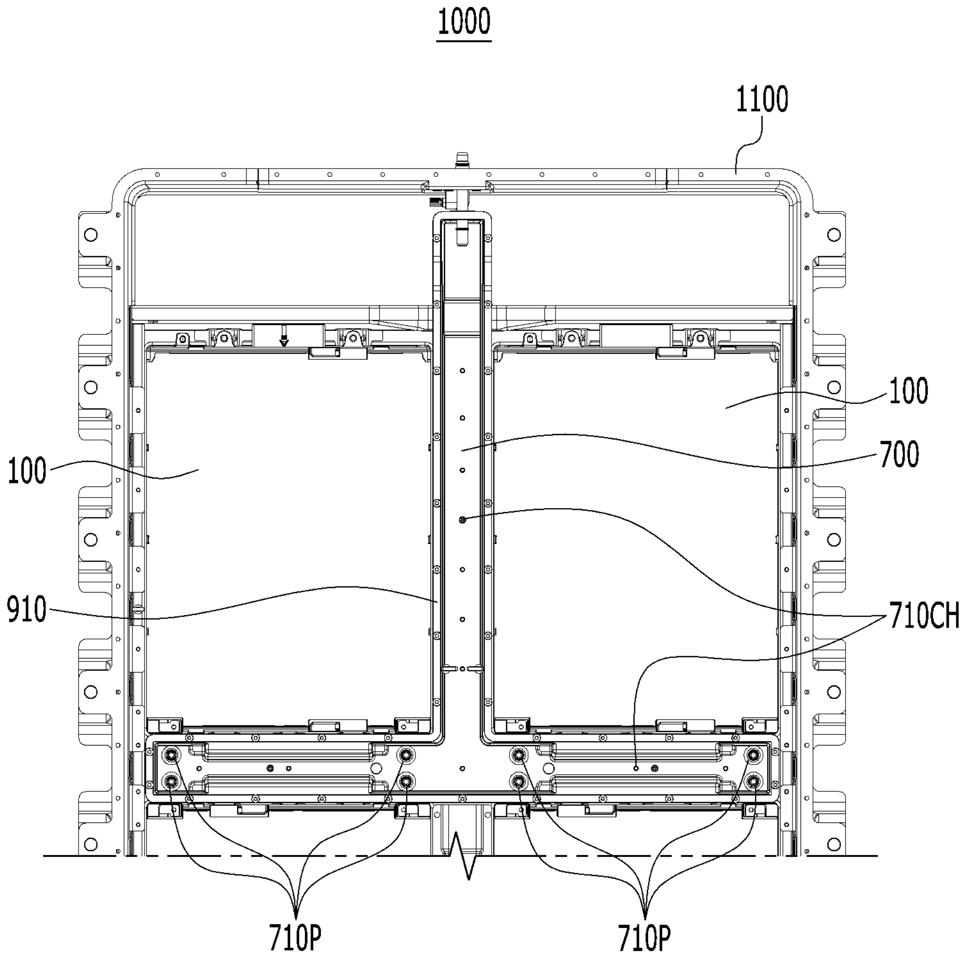
FIG. 10 illustrates a top plan view of a battery pack viewed from top to bottom so that a bottom surface of a pack refrigerant pipe housing according to an embodiment of the present invention is visible.
Figure 11:
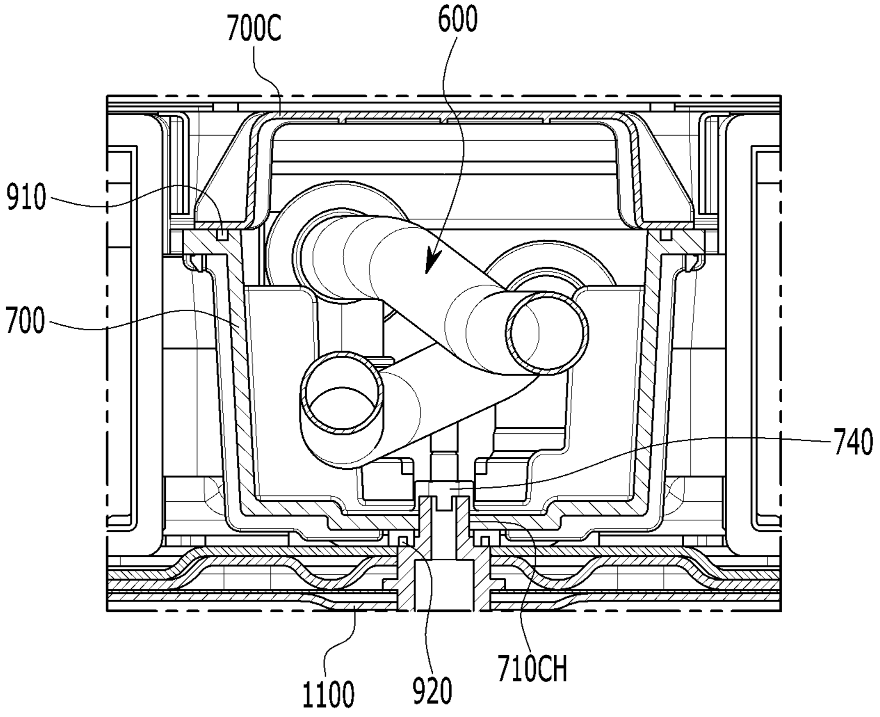
FIG. 11 illustrates a cross-sectional view taken along line 11-11 of FIG. 6.

FIG. 9 partially illustrates a connecting port and a cooling port according to the present embodiment. FIG. 10 illustrates a top plan view of a battery pack viewed from top to bottom so that a bottom surface of a pack refrigerant pipe housing according to an embodiment of the present invention is visible. FIG. 11 illustrates a cross-sectional view taken along line 11-11 of FIG. 6. Particularly, for convenience of explanation, the illustration of the pack refrigerant pipe housing and the second gasket is omitted in FIG. 9, and the illustration of the housing cover and the pack refrigerant pipe assembly is omitted in FIG. 10.

Referring to FIG. 8 to FIG. 11, an opening 710P may be formed on a bottom surface of the pack refrigerant pipe housing 700 according to the present embodiment. A second gasket 920 may be coupled to a portion in which the opening 710P is formed.

Specifically, the second gasket 920 may be positioned between the module frame protrusion 211 and the pack refrigerant pipe housing 700 to seal between the module frame protrusion 211 and the pack refrigerant pipe housing 700. In this case, the cooling port 500 may protrude into the pack refrigerant pipe housing 700 by penetrating the second gasket 920 and the opening 710P from an upper surface of the module frame protrusion 211 upward. The connecting port 620 may be coupled to the cooling port 500 by penetrating the opening 710P and the second gasket 920 downward. As shown in FIG. 8, the second gasket 920 may include a penetrating portion through which the cooling port 500 or the connecting port 620 may penetrate.

On the other hand, in the coupling between the cooling port 500 and the connecting port 620, as shown in FIG. 9, the cooling port 500 may be inserted and coupled to a lower side of the connecting port 620, and a lower end of the connecting port 620 may be in contact with an upper surface of the module frame protrusion 211. That is, in a form in which the cooling port 500 is inserted into the connecting port 620, the cooling port 500 and the connecting port 620 may be coupled. As described above, in FIG. 9, the illustration of the pack refrigerant pipe housing 700 and the second gasket 920 is omitted for convenience of explanation, but actually, the second gasket 920 and the pack refrigerant pipe housing 700 may be positioned on the module frame protrusion 211 as shown in FIG. 8.

Meanwhile, a sealing member 630 may be positioned between the cooling port 500 and the connecting port 620. The sealing member 630 may have a ring shape, and may be fitted between the cooling port 500 and the connecting port 620. With the sealing member 630 fitted in the cooling port 500, it may be inserted into the connecting port 620 together with the cooling port 500. The sealing member 630 may prevent a refrigerant from leaking through a gap between the cooling port 500 and the connecting port 620.

As described above, since the pack refrigerant pipe assembly 600 positioned inside the pack refrigerant pipe housing 700 and the cooling port 500 for supplying and discharging a refrigerant to and from the plurality of battery modules 100 are coupled to each other to circulate the refrigerant, the opening 710P is required to couple the pack refrigerant pipe assembly 600 and the cooling port 500. In addition, as in the present embodiment, the second gasket 920 is formed at the outside of the opening 710P to seal the space between the bottom surface of the pack refrigerant pipe housing 700 and the module frame protrusion 211 where the cooling port 500 is formed, so that it is possible to prevent the refrigerant collected inside the pack refrigerant pipe housing 700 from leaking through the opening 710P. That is, it is possible to block the refrigerant from leaking to a lower portion of the pack refrigerant pipe housing 700.

Meanwhile, referring to FIG. 10 and FIG. 11, a coupling hole 710CH may be formed in the bottom surface of the pack refrigerant pipe housing 700. In the coupling hole 710CH, as shown in FIG. 11, a coupling member 740 may be inserted. The coupling member 740 may be inserted into the coupling hole 710CH to couple the pack refrigerant pipe housing 700 and the pack frame 1100. A stable cooling structure may be formed by fixing the pack refrigerant pipe housing 700 to the pack frame 1100 through the coupling member 740 and the coupling hole 710CH.

Referring to FIG. 11, a refrigerant watertight structure is formed on the outside of the pack refrigerant pipe assembly 600 according to the present embodiment through the pack refrigerant pipe housing 700, the housing cover 700C, the first gasket 910, and the second gasket 920. Therefore, through the pack refrigerant pipe assembly 600, a structural device that prevents the leaked refrigerant from penetrating into parts inside the battery pack may be provided, and at the same time, the leaked refrigerant may be more efficiently managed by discharging the leaked refrigerant collected in the pack refrigerant pipe housing 700 to the outside by using a drain valve or the like.

Hereinafter, a pack refrigerant pipe housing provided with a drain valve according to another embodiment of the present invention will be described in detail.

Figure 12:
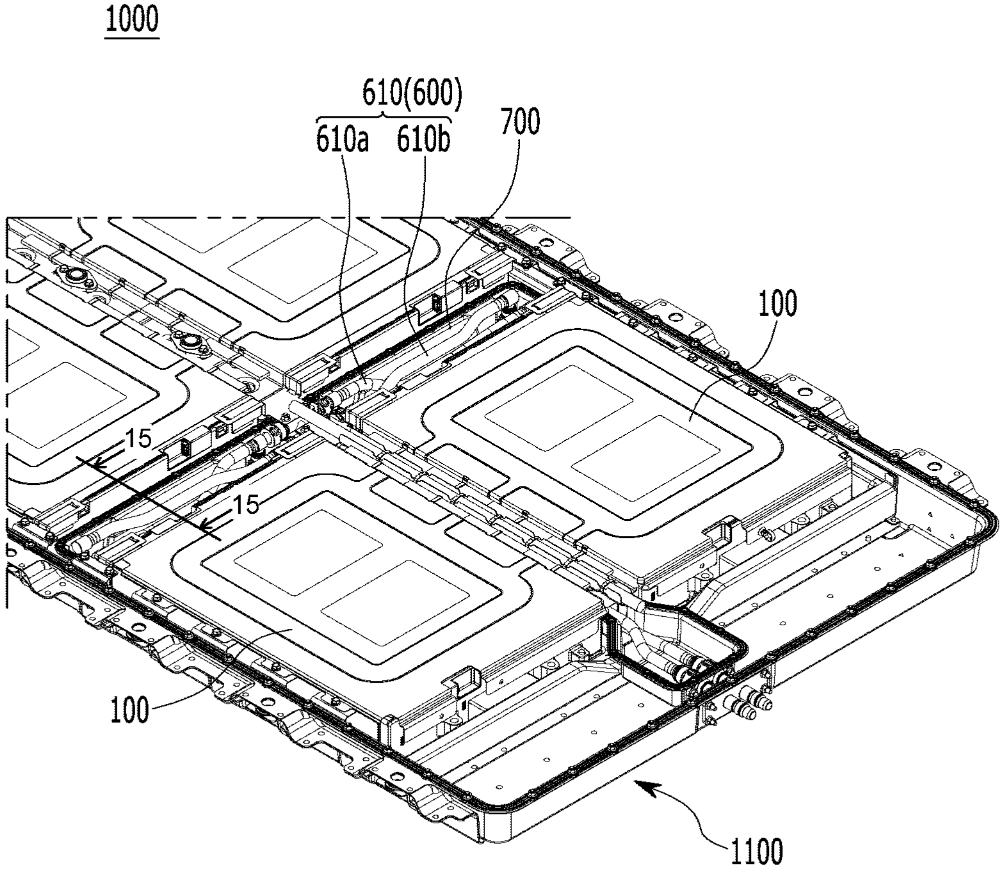
FIG. 12 illustrates a perspective view of a battery pack according to another embodiment of the present invention.
Figure 13:
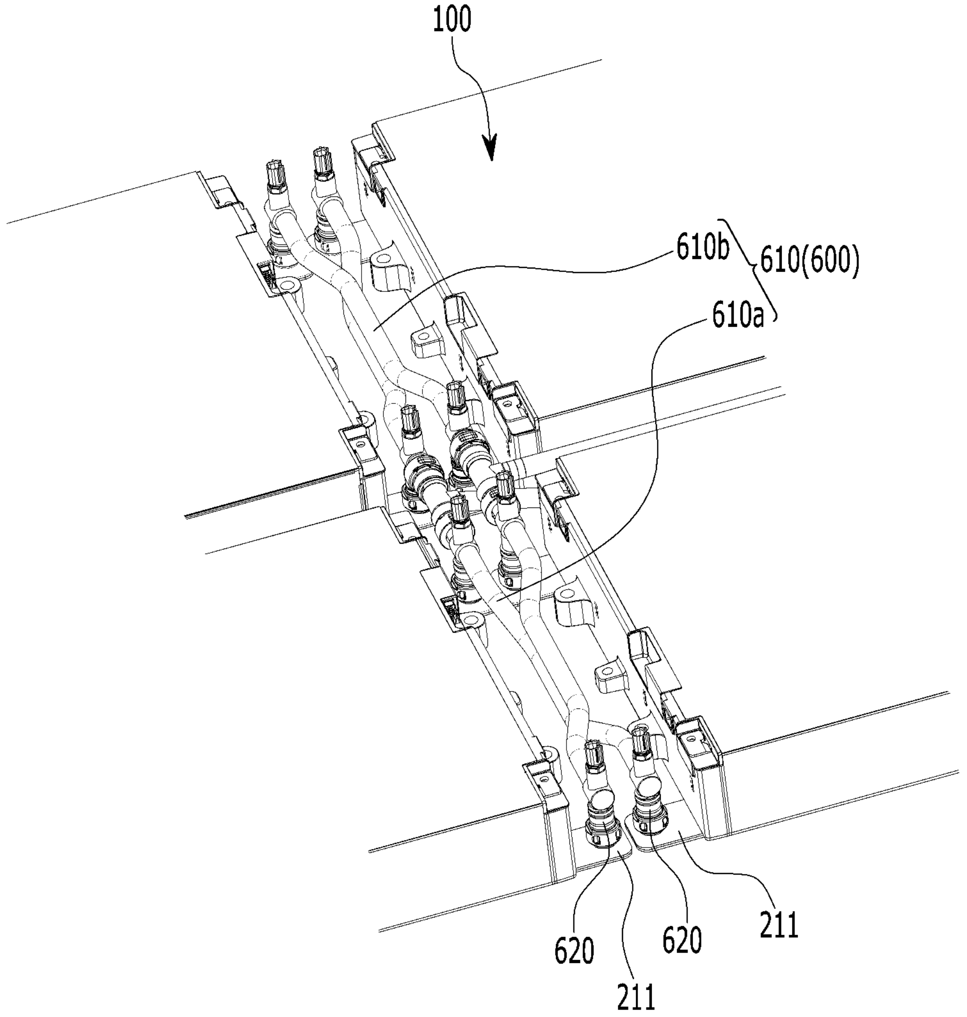
FIG. 13 illustrates a partial perspective view of a connection relationship between battery modules and a pack refrigerant pipe assembly included in the battery pack of FIG. 12.
Figure 14:
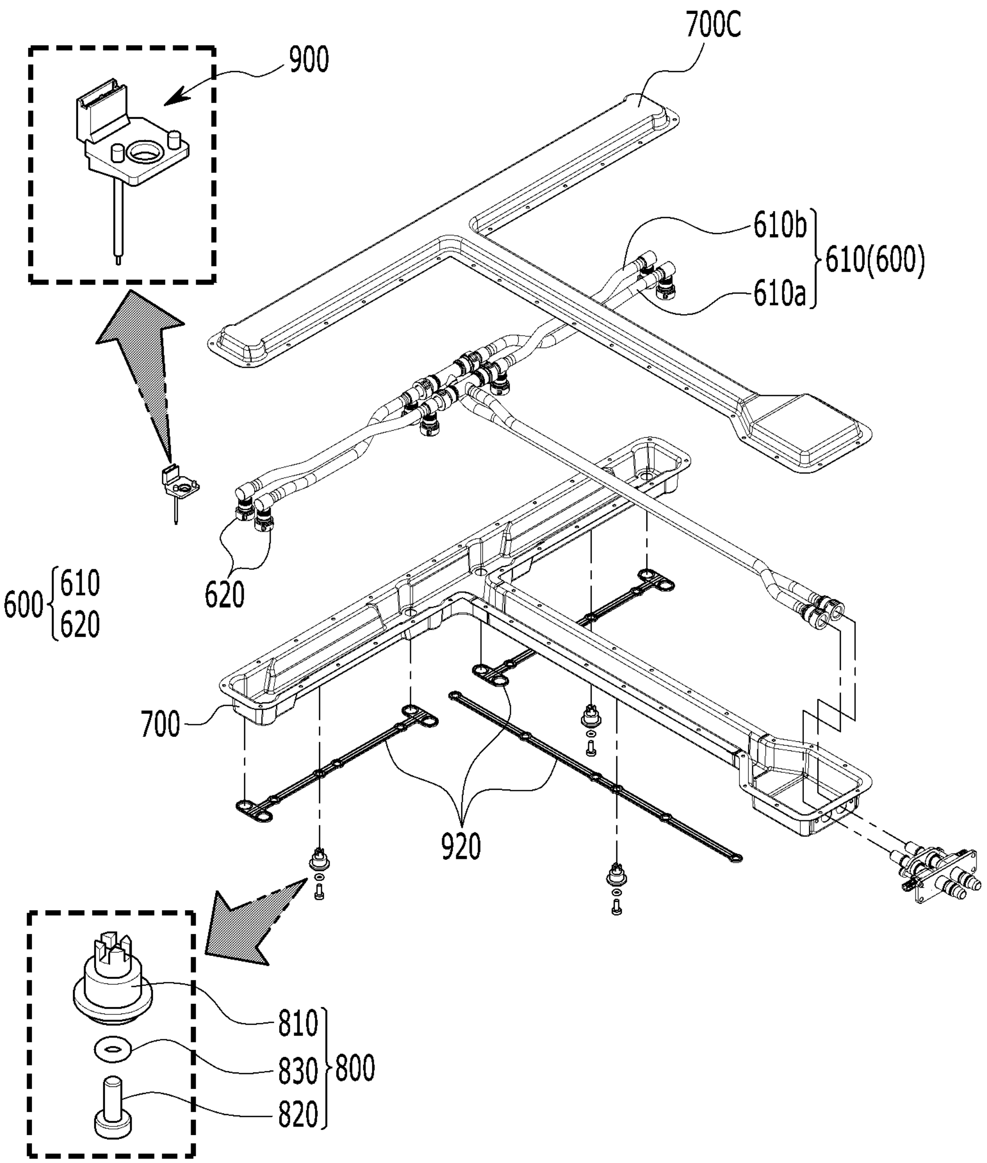
FIG. 14 illustrates an exploded perspective view of a pack refrigerant pipe assembly and a pack refrigerant pipe housing included in the battery pack of FIG. 12.

FIG. 12 illustrates a perspective view of a battery pack according to another embodiment of the present invention. FIG. 13 illustrates a partial perspective view of a connection relationship between battery modules and a pack refrigerant pipe assembly included in the battery pack of FIG. 12. The illustration of the pack refrigerant pipe housing is omitted for convenience of explanation in FIG. 13. FIG. 14 illustrates an exploded perspective view of a pack refrigerant pipe assembly and a pack refrigerant pipe housing included in the battery pack of FIG. 12.

Referring to FIG. 4, FIG. 12, FIG. 13, and FIG. 14, a battery pack 1000 according to another embodiment of the present invention includes: a plurality of battery modules 100 including battery cells; a pack frame 1100 accommodating the battery modules 100; a pack refrigerant pipe assembly 600 connected to the battery module 100; and a pack refrigerant pipe housing 700 accommodating the pack refrigerant pipe assembly 600.

The pack refrigerant pipe assembly 600 according to the present embodiment may include a pack refrigerant pipe 610 and a connecting port 620 connecting the pack refrigerant pipe 610 and the cooling port 500. The pack refrigerant pipe 610 may include a pack refrigerant supplying pipe 610*a* and a pack refrigerant discharging pipe 610*b*. Here, the pack refrigerant supplying pipe 610*a* includes both the main pack refrigerant supplying pipe and the sub-pack refrigerant supplying pipe described above, and the pack refrigerant discharging pipe 610*b* includes both the main pack refrigerant discharging pipe and the sub-pack refrigerant discharging pipe described above.

As described above, the battery module may include a cooling port 500, and the cooling port 500 may include a refrigerant injecting port 500*a* and a refrigerant discharging port 500*b* that are spaced apart from each other. The refrigerant injecting port 500*a* and the refrigerant discharging port 500*b* may be connected to the pack refrigerant supplying pipe 610*a* and the pack refrigerant discharging pipe 610*b*, respectively.

The refrigerant may be supplied to the heat sink 300 of the battery module 100 through the pack refrigerant supplying pipe 610*a*, and the refrigerant may be discharged from the heat sink 300 of the battery module 100 through the pack refrigerant discharging pipe 610*b*.

In this case, the pack refrigerant supplying pipe 610*a* may be connected to the plurality of battery modules 100 to supply a refrigerant, and the pack refrigerant discharging pipe 610*b* may be connected to the plurality of battery modules 100 to discharge the refrigerant. Further details will be described later below.

Figure 15:
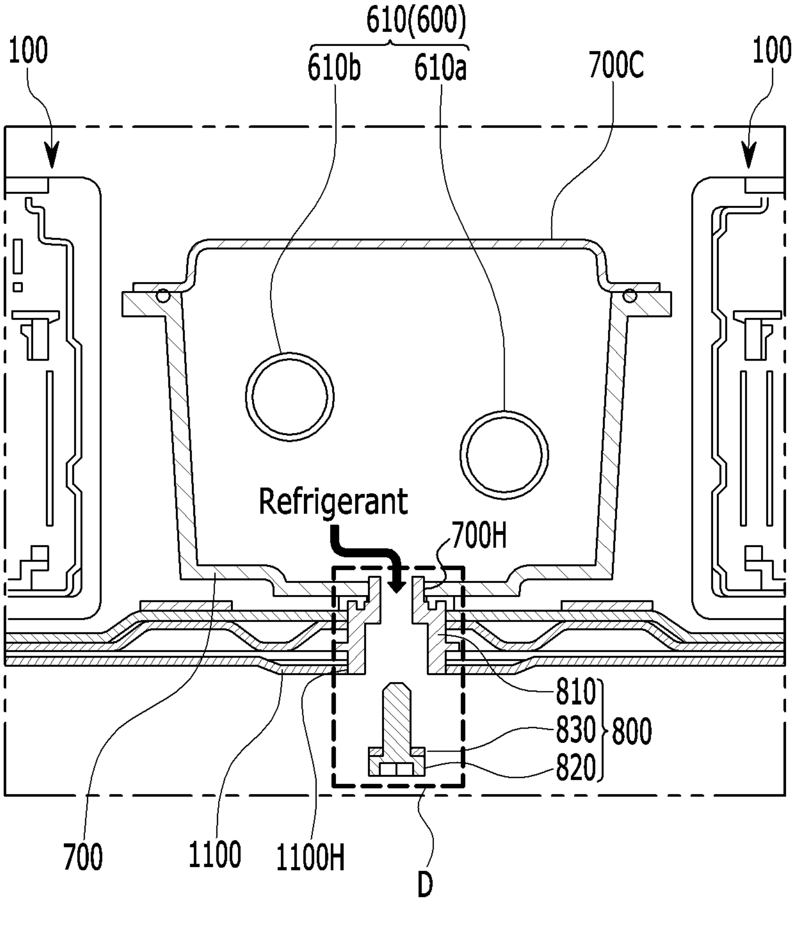
FIG. 15 illustrates a cross-sectional view taken along line 15-15 of FIG. 12.

FIG. 15 illustrates a cross-sectional view taken along line 15-15 of FIG. 12. Particularly, FIG. 15 illustrates a cross-section of the pack refrigerant pipe and the pack refrigerant pipe housing.

Referring to FIG. 14 and FIG. 15, as described above, the battery pack 1000 according to the present embodiment includes the pack refrigerant pipe housing 700 accommodating the pack refrigerant pipe assembly 600, and the pack refrigerant pipe housing 700 extends along the pack refrigerant pipe 610 of the pack refrigerant pipe assembly 600.

The pack refrigerant pipe housing 700 may accommodate the pack refrigerant pipe 610 including the pack refrigerant supplying pipe 610*a* and the pack refrigerant discharging pipe 610*b* in a state in which the upper side thereof is open, and the housing cover 700C may cover the open upper side of the pack refrigerant pipe housing 700.

The battery pack 1000 may be applied to transportation means such as electric vehicles and hybrid vehicles, but a refrigerant such as a coolant may leak due to assembly defects or accidents during operation. The leaked refrigerant may penetrate into a plurality of components configuring the battery pack 1000 to cause a fire or explosion. Accordingly, since the battery pack 1000 according to the present embodiment includes the pack refrigerant pipe housing 700 accommodating the pack refrigerant pipe assembly 600, the leaked refrigerant is collected on the bottom surface of the pack refrigerant pipe housing 700, and thus it is possible prevent it from penetrating into other components in the battery pack 1000. In this case, it is preferable that the pack refrigerant pipe housing 700 has a deep depth in a direction perpendicular to the bottom surface thereof so that the refrigerant may be effectively collected.

On the other hand, the connecting port 620 in the pack refrigerant supplying pipe 610*a* and the pack refrigerant discharging pipe 610*b* passes through the opening of the pack refrigerant pipe housing 700 to be connected to the refrigerant injecting port 500_a_ and the refrigerant discharging port 500_b_, respectively. That is, a plurality of openings may be formed on the bottom surface of the pack refrigerant pipe housing 700 so that the connecting ports 620 may be connected to the refrigerant injecting port 500_a_ or the refrigerant discharging port 500_b_. In addition, it is preferable that the second gasket 920 corresponding to the opening is provided to prevent leakage through the opening. The opening 710P (see FIG. 8 or FIG. 10) and the second gasket 920 have been described in detail with reference to FIG. 8 to FIG. 10, so further descriptions will be omitted.

Figure 16:
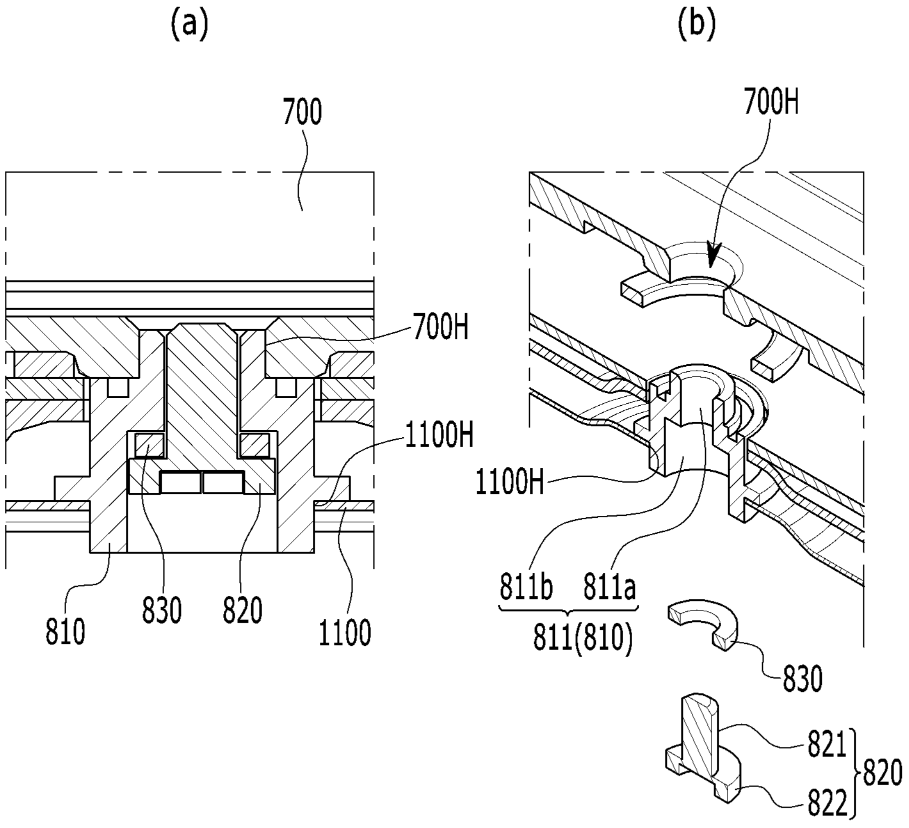
FIGS. 16 (*a*) and (*b*) are partial drawings of an area indicated by "D" of FIG. 15 viewed from different angles.

FIGS. 16 (_a_) and (_b_) are partial drawings of an area indicated by "D" of FIG. 15 viewed from different angles.

Referring to FIG. 14, FIGS. 15, and 16 (_a_) and (_b_), the battery pack 1000 according to the present embodiment may include a drain valve 800 having a structure that may be opened and closed, and the drain valve 800 may be formed on the bottom surface of the pack refrigerant pipe housing 700.

A first outlet 700H may be formed in the pack refrigerant pipe housing 700, and a second outlet 1100H may be formed in the pack frame 1100 accommodating a plurality of battery modules 100, and the drain valve 800 may connect the first outlet 700H and the second outlet 1100H.

Meanwhile, the drain valve 800 may include a spacer 810 in which a connecting pipe 811 connecting the first outlet 700H and the second outlet 1100H is formed and a drain plug 820 inserted into the connecting pipe 811. Through the configuration of the spacer 810 and the drain plug 820, the drain valve 800 may form a structure that may be opened and closed.

Specifically, the connecting pipe 811 of the spacer 810 may include a first connecting pipe 811_a_ in a direction of the first outlet 700H and a second connecting pipe 811_b_ in a direction of the second outlet 1100H, and the first connecting pipe 811_a_ may have a smaller inner diameter than that of the second connecting pipe 811_b_. The drain plug 820 may include an inserting part 821 having a diameter corresponding to the inner diameter of the first connecting pipe 811_a_ and a fixing part 822 having a diameter corresponding to the inner diameter of the second connecting pipe 811_b_.

The inserting part 821 of the drain plug 820 may be inserted into the first connecting pipe 811_a_ of the spacer 810 to close the drain valve 800, and the refrigerant leaked from the pack refrigerant pipe 610 may be collected on the bottom surface of the refrigerant pipe housing 700. In addition, since the fixing part 822 is caught without being inserted into the first connecting pipe 811_a_, it is possible to prevent the drain plug 820 from entering the pack refrigerant pipe housing 700.

The drain valve 800 may further include a sealing ring 830 positioned between the spacer 810 and the drain plug 820. Specifically, after the sealing ring 830 is inserted into the inserting part 821, it may be positioned between a step formed by the first connecting pipe 811_a_ and the second connecting pipe 811_b_ and the fixing part 822. By providing the sealing ring 830, it is possible to prevent a refrigerant from leaking through a gap therebetween in a state in which the inserting part 821 is inserted into the first connecting pipe 811_a_.

Meanwhile, referring to FIG. 14, the battery pack 1000 according to the present embodiment may further include a leakage detecting sensor 900 accommodated in the pack refrigerant pipe housing 700. Particularly, the leakage detecting sensor 900 may extend to the bottom surface of the pack refrigerant pipe housing 700 to detect the refrigerant collected on the bottom surface of the pack coolant pipe housing 700. When the refrigerant leaks from the pack refrigerant pipe assembly 600, the leaked refrigerant is collected on the bottom surface of the pack refrigerant pipe housing 700. The leakage detecting sensor 900 may detect the leaked refrigerant, and may transmit a signal. According to this signal, the drain plug 820 may be pulled out from the spacer 810, and the refrigerant may be discharged to the outside of the pack frame 1100 through the first outlet 700H and the second outlet 1100H. That is, according to the present embodiment, while the refrigerant leaked from the pack refrigerant pipe assembly 600 through the pack refrigerant pipe housing 700 is prevented from penetrating into other components in the battery pack 1000, the leaked refrigerant may be discharged to the outside of the battery pack 1000 through the drain valve 800 and the leakage detecting sensor 900 according to situations. Through the above process, it is possible to prevent the leakage of the refrigerant from causing a fire or explosion of the battery pack 1000.

Figure 17:
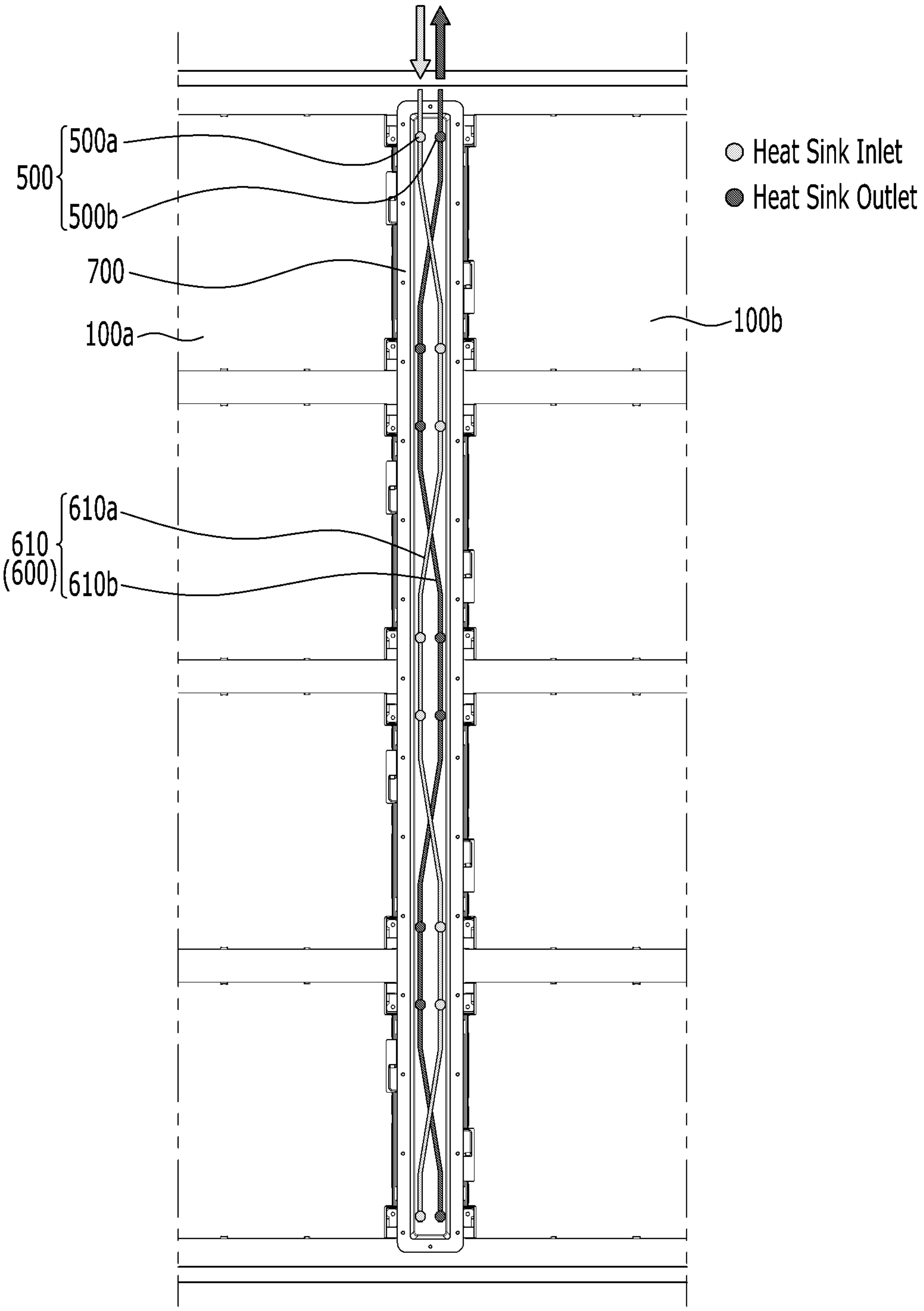
FIG. 17 and FIG. 18 respectively illustrate a top plan view of a battery pack according to an embodiment of the present invention.
Figure 18:
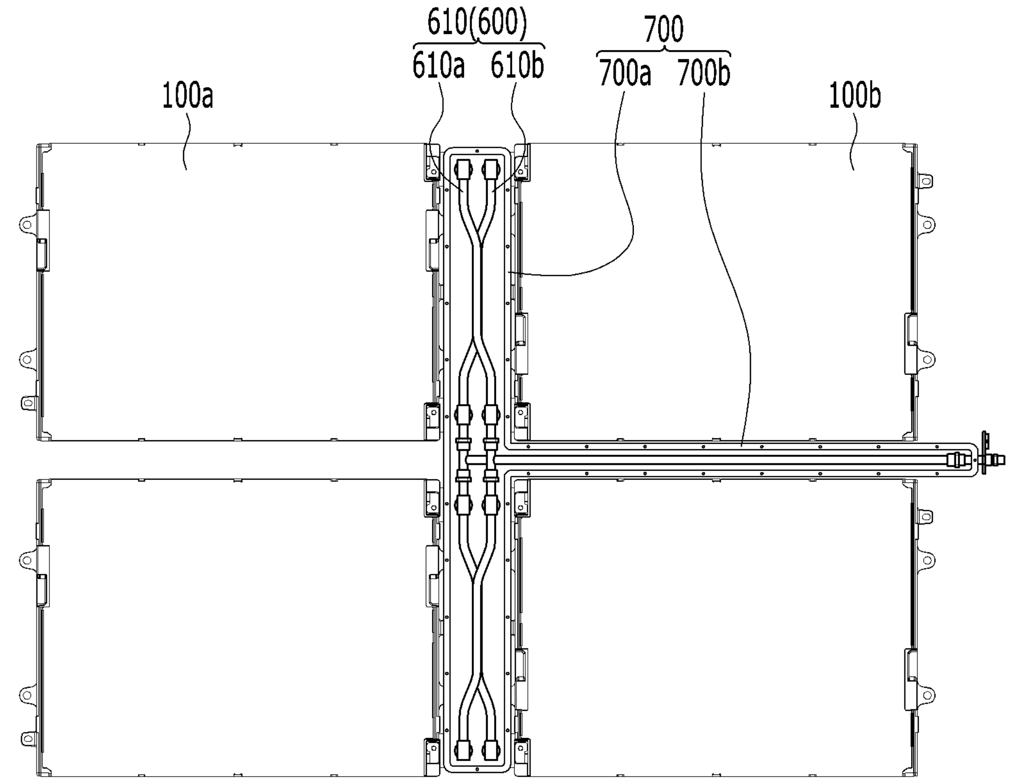

FIG. 17 and FIG. 18 respectively illustrate a top plan view of a battery pack according to an embodiment of the present invention.

First, referring to FIG. 4, FIG. 13, and FIG. 17, a plurality of battery modules 100 included in the battery pack 1000 according to the present embodiment are arranged in two rows in a direction in which the battery cells 110 are stacked, and may include a first battery module 100_a_ and a second battery module 100_b_ facing each other in a direction perpendicular to the direction in which the battery cells 110 are stacked. As shown in FIG. 17, the first battery module 100_a_ and the second battery module 100_b_ may refer to battery modules spaced apart from each other in left and right directions. Between the first battery module 100_a_ and the second battery module 100_b_, the refrigerant injecting port 500_a_ and the refrigerant discharging port 500_b_ may be disposed. Accordingly, the pack refrigerant pipe 610 of the pack refrigerant pipe assembly 600 may also be disposed between the first battery module 100_a_ and the second battery module 100_b_. In addition, among the battery modules 100 facing each other, the refrigerant injecting port 500_a_ formed in the first battery module 100_a_ and the refrigerant discharging port 500_b_ formed in the second battery module 100_b_ may be disposed while facing each other. FIG. 13 also illustrates a structure in which, in the battery modules 100 facing each other, the refrigerant injecting port 500_a_ and the refrigerant discharging port 500_b_ are disposed to face each other.

The pack refrigerant supplying pipe 610_a_ and the pack refrigerant discharging pipe 610_b_ may extend while crossing each other. By having such an disposition structure, it is possible to increase the space utilization rate and simultaneously improve the cooling efficiency while implementing the integrated structure of the cooling structure with the plurality of battery modules 100. In other words, the refrigerant injecting port 500_a_ formed in the first battery module 100_a_ and the refrigerant discharging port 500_b_ formed in the second battery module 100_b_ are disposed to face each other, and then while the pack refrigerant supplying pipe 610_a_ and the pack refrigerant discharging pipe 610_b_ cross each other, the pack refrigerant supplying pipe 610_a_ is connected to the refrigerant injecting ports 500_a_, and the pack refrigerant discharging pipe 610_b_ is connected to the refrigerant discharging ports 500_b_. One pack refrigerant supplying pipe 610_a_ and one pack refrigerant discharging pipe 610_b_ are configured to be respectively connected to the plurality of battery modules 100. Through this, it is possible to efficiently dispose the plurality of battery modules 100 and pack refrigerant pipes 610 without wasting unnecessary space.

In order to have the disposition structure of the pack refrigerant pipe 610 as described above, heights of the pack refrigerant supplying pipe 610*a* and the pack refrigerant discharging pipe 610*b* may be different from each other. The pack refrigerant supplying pipe 610*a* and the pack refrigerant discharging pipe 610*b* having the different heights may be portions.

The module frame protrusion 211 included in the battery module 100 described with reference to FIG. 5 is formed to extend past the end plate 400, and the module frame protrusion 211 may be positioned in a space between the adjacent battery modules 100 to each other in which the pack refrigerant pipe 610 is disposed. The heat sink 300 described in FIG. 4 includes the heat sink protrusion 300P protruding from one side of the heat sink 300 to a portion where the module frame protrusion 211 is positioned, and the heat sink protrusion 300P and the module frame protrusion 211 may be bonded to each other. In this case, the heat sink protrusion 300P and the module frame protrusion 211 may be directly bonded by a method such as welding.

Then, referring to FIG. 4, FIG. 13, and FIG. 18, a plurality of battery modules 100 according to the present embodiment are arranged in two rows in a direction in which the battery cells 110 are stacked, and may include a first battery module 100*a* and a second battery module 100*b* facing each other in a direction perpendicular to the direction in which the battery cells 110 are stacked. Between the first battery module 100*a* and the second battery module 100*b*, the refrigerant injecting port 500*a* and the refrigerant discharging port 500*b* may be disposed.

In this case, the pack refrigerant pipe 610 may extend along one direction while being positioned between the first battery module 100*a* and the second battery module 100*b*, and in order to receive or discharge the refrigerant, a part thereof may extend between the adjacent battery modules along a direction perpendicular to the one direction. That is, as described in FIG. 7, the pack refrigerant pipe 610 may include the main pack refrigerant pipe 611, and the sub-pack refrigerant pipe 612 respectively extending in both directions perpendicular to the longitudinal direction of the main pack refrigerant pipe 611.

Accordingly, the pack refrigerant pipe housing 700 may include a first part 700*a* extending along one direction between the first battery module 100*a* and the second battery module 100*b*, and a second part 700*b* extending between the adjacent battery modules along a direction perpendicular to the one direction. That is, the pack refrigerant pipe housing 700 including the first part 700*a* and the second part 700*b* when viewed from above as in FIG. 18 may form a T-shaped structure. The sub-pack refrigerant pipe 612 (refer to FIG. 7) is accommodated in the first part 700*a*, and the main pack refrigerant pipe 611 (refer to FIG. 7) is accommodated in the second part 700*b*.

Meanwhile, referring back to FIG. 4, a protrusion pattern 340D may be formed in the recessed part 340 of the heat sink 300 according to the present embodiment. In the case of a large-area battery module in which the number of the battery cells stacked as in the battery cell stack 120 according to the present embodiment significantly increases compared with that of the prior art, a width of the refrigerant flow path may be formed to be wider, so that the temperature deviation may be more severe. In the large-area battery module, about 32 to 48 battery cells may be stacked in one battery module, compared with a case in which about 12 to 24 battery cells are stacked in one battery module in the prior art. In this case, the protrusion pattern 340D according to the present embodiment has the effect of substantially reducing the width of the cooling flow path, thereby minimizing the pressure drop and reducing the temperature deviation between the widths of the refrigerant flow path. Therefore, it is possible to implement a uniform cooling effect.

In the present embodiment, although the terms indicating the directions such as forward, backward, left, right, up, and down have been used, these terms are only for convenience of description, and may be changed depending on the position of target objects or observers.

One or more battery modules according to the present embodiment described above may be mounted together with various control and protection systems, such as a battery management system (BMS), a battery disconnect unit (BDU), and a cooling system, to form a battery pack.

The battery module or the battery pack may be applied to various devices. Specifically, it may be applied to a transportation apparatus such as an electric bicycle, an electric vehicle, and a hybrid vehicle or to an energy storage system (ESS), but are not limited thereto, and may be applied to various devices that can use the secondary battery.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

200: module frame
211: module frame protrusion
300: heat sink
500: cooling port
600: pack refrigerant pipe assembly
610: pack refrigerant pipe
620: connecting port
700: pack refrigerant pipe housing
800: drain valve
900: leakage detecting sensor
1000: battery pack
1100: pack frame

The invention claimed is:

1. A battery pack comprising:

a plurality of battery modules formed in two rows, each of the plurality of battery modules including a module frame, battery cells, a heat sink and at least one cooling port supplying a refrigerant to the heat sink or discharging a refrigerant from the heat sink;

a pack frame accommodating the plurality of battery modules;

a pack refrigerant pipe assembly including at least one pack refrigerant pipe connected to the at least one cooling port of each of the plurality of battery modules; and a pack refrigerant pipe housing accommodating the pack refrigerant pipe assembly, wherein the plurality of battery modules and the at least one pack refrigerant pipe are supported on a first surface of the pack frame, wherein the at least one pack refrigerant pipe is in a space between the two rows of the plurality of battery modules, wherein an opening is formed in a bottom surface of the pack refrigerant pipe housing, and a second gasket is coupled to a portion of the pack refrigerant pipe housing in which the opening is formed, wherein the battery module includes:

a battery cell stack in which the battery cells are stacked; and a module frame accommodating the battery cell stack, wherein the heat sink is below the module frame, wherein the module frame includes a module frame protrusion protruding from a bottom part of the module frame, wherein the second gasket is positioned between the module frame protrusion and the pack refrigerant pipe housing, wherein the bottom part of the module frame configures an upper plate of the heat sink, and wherein the bottom part of the module frame is in contact with the refrigerant.

2. The battery pack of claim 1, further comprising:

a housing cover covering an upper portion of the pack refrigerant pipe housing; and a first gasket sealing between the pack refrigerant pipe housing and the housing cover.

3. A battery pack comprising:

a plurality of battery modules formed in two rows, each of the plurality of battery modules including a module frame, battery cells, a heat sink and at least one cooling port supplying a refrigerant to the heat sink or discharging a refrigerant from the heat sink;

a pack frame accommodating the plurality of battery modules;

a pack refrigerant pipe assembly including at least one pack refrigerant pipe connected to the at least one cooling port of each of the plurality of battery modules; and a pack refrigerant pipe housing accommodating the pack refrigerant pipe assembly, wherein the plurality of battery modules and the at least one pack refrigerant pipe are supported on a first surface of the pack frame, wherein the at least one pack refrigerant pipe is in a space between the two rows of the plurality of battery modules, wherein an opening is formed in a bottom surface of the pack refrigerant pipe housing, and a second gasket is coupled to a portion of the pack refrigerant pipe housing in which the opening is formed, wherein the battery module includes:

a battery cell stack in which the battery cells are stacked; and a module frame accommodating the battery cell stack, wherein the heat sink is below the module frame, wherein the module frame includes a module frame protrusion protruding from a bottom part of the module frame, wherein the second gasket is positioned between the module frame protrusion and the pack refrigerant pipe housing, and wherein the at least one cooling port, at an upper surface of the module frame protrusion, passes through the second gasket and the opening to protrude into the pack refrigerant pipe housing.

4. A battery pack comprising:

a plurality of battery modules formed in two rows, each of the plurality of battery modules including a module frame, battery cells, a heat sink and at least one cooling port supplying a refrigerant to the heat sink or discharging a refrigerant from the heat sink;

a pack frame accommodating the plurality of battery modules;

a pack refrigerant pipe assembly including at least one pack refrigerant pipe connected to the at least one cooling port of each of the plurality of battery modules; and a pack refrigerant pipe housing accommodating the pack refrigerant pipe assembly, wherein the plurality of battery modules and the at least one pack refrigerant pipe are supported on a first surface of the pack frame, wherein the at least one pack refrigerant pipe is in a space between the two rows of the plurality of battery modules, wherein an opening is formed in a bottom surface of the pack refrigerant pipe housing, and a second gasket is coupled to a portion of the pack refrigerant pipe housing in which the opening is formed, wherein the battery module includes:

a battery cell stack in which the battery cells are stacked; and a module frame accommodating the battery cell stack, wherein the heat sink is below the module frame, wherein the module frame includes a module frame protrusion protruding from the bottom part of the module frame, wherein the second gasket is positioned between the module frame protrusion and the pack refrigerant pipe housing, wherein the pack refrigerant pipe assembly further includes at least one connecting port connecting the at least one pack refrigerant pipe and the at least one cooling port, and the at least one connecting port penetrates the opening and the second gasket to be coupled to the at least one cooling port.

5. The battery pack of claim 4, wherein the at least one cooling port is inserted into and coupled to a lower side of the at least one connecting port, and a lower end of the at least one connecting port is in contact with an upper surface of the module frame protrusion.

6. The battery pack of claim 4, wherein a sealing member is positioned between the at least one cooling port and the at least one connecting port.

7. The battery pack of claim 1, wherein a coupling hole is formed in a bottom surface of the pack refrigerant pipe housing, and wherein a coupling member is inserted into the coupling hole to couple the pack refrigerant pipe housing and the pack frame.

8. The battery pack of claim 1, further comprising a drain valve that is formed on the bottom surface of the pack refrigerant pipe housing and has a structure that is able to be opened and closed.

9. The battery pack of claim 8, wherein a first outlet is formed in the pack refrigerant pipe housing, a second outlet is formed in the pack frame, and the drain valve connects the first outlet and the second outlet.

10. The battery pack of claim 9, wherein the drain valve includes a spacer formed with a connecting pipe connecting the first outlet and the second outlet, and a drain plug inserted into the connecting pipe.

11. The battery pack of claim 10, wherein the connecting pipe includes a first connecting pipe of a first outlet direction and a second connecting pipe of a second outlet direction, wherein the first connecting pipe has a smaller inner diameter than the second connecting pipe, and wherein the drain plug includes an inserting part having a diameter corresponding to an inner diameter of the first connecting pipe and a fixing part having a diameter corresponding to an inner diameter of the second connecting pipe.

12. The battery pack of claim 10, wherein the drain valve further includes a sealing ring positioned between the spacer and the drain plug.

13. The battery pack of claim 1, further comprising a leakage detecting sensor accommodated in the pack refrigerant pipe housing.

14. The battery pack of claim 1, wherein the plurality of battery modules are disposed in a lattice form, and wherein the pack refrigerant pipe assembly and the pack refrigerant pipe housing are disposed between the plurality of battery modules.

15. The battery pack of claim 14, wherein the at least one pack refrigerant pipe includes a main pack refrigerant pipe and a sub-pack refrigerant pipe connecting the main pack refrigerant pipe and the plurality of battery modules, wherein the sub-pack refrigerant pipe extends from one end of the main pack refrigerant pipe in both directions perpendicular to a longitudinal direction of the main pack refrigerant pipe, and wherein the pack refrigerant pipe housing extends along portions in which the main pack refrigerant pipe and the sub-pack refrigerant pipe extend.

16. The battery pack of claim 1, wherein the at least one cooling port includes a refrigerant injecting port supplying a refrigerant to the heat sink, and a refrigerant discharging port discharging a refrigerant from the heat sink, and wherein the refrigerant injecting port formed in a first battery module of the plurality of battery modules and the refrigerant discharging port formed in a second battery module of the plurality of battery modules adjacent the first battery module face each other.

17. The battery pack of claim 16, wherein the battery modules are disposed in two rows in a direction in which the battery cells are stacked, and wherein the refrigerant injecting port in the first battery module and the refrigerant discharging port in the second battery module are disposed between the first battery module and the second battery module.

* * * * *